(12) United States Patent
Jia et al.

(10) Patent No.: US 12,181,634 B2
(45) Date of Patent: Dec. 31, 2024

(54) CAMERA LENS ASSEMBLY

(71) Applicant: ZHEJIANG SUNNY OPTICS CO., LTD., Yuyao Zhejiang (CN)

(72) Inventors: Yuanlin Jia, Yuyao Zhejiang (CN); Wuchao Xu, Yuyao Zhejiang (CN)

(73) Assignee: ZHEJIANG SUNNY OPTICS CO., LTD., Yuyao Zhejiang (CN)

( * ) Notice: Subject to any disclaimer, the term of this patent is extended or adjusted under 35 U.S.C. 154(b) by 919 days.

(21) Appl. No.: 17/128,577

(22) Filed: Dec. 21, 2020

(65) Prior Publication Data

US 2021/0109326 A1  Apr. 15, 2021

Related U.S. Application Data

(63) Continuation of application No. PCT/CN2019/087375, filed on May 17, 2019.

(30) Foreign Application Priority Data

Sep. 5, 2018  (CN) ......................... 201811032313.X

(51) Int. Cl.
*G02B 13/18* (2006.01)
*G02B 9/62* (2006.01)
(Continued)

(52) U.S. Cl.
CPC ........... *G02B 13/0045* (2013.01); *G02B 9/62* (2013.01); *G02B 27/0025* (2013.01)

(58) Field of Classification Search
CPC . G02B 9/00; G02B 9/61; G02B 13/00; G02B 13/001; G02B 13/0015;
(Continued)

(56) References Cited

U.S. PATENT DOCUMENTS 6,801,375 B2  10/2004  Hayashide
9,507,127 B2  11/2016  Asami
(Continued)

FOREIGN PATENT DOCUMENTS

CN      1456915 A    11/2003
CN    105143948 A    12/2015
(Continued)

OTHER PUBLICATIONS

English Translation of International Search Report mailed Aug. 7, 2019, in connection with PCT International Application No. PCT/CN2019/087375.
(Continued)

*Primary Examiner* — Thong Q Nguyen
(74) *Attorney, Agent, or Firm* — Norris Mclaughlin, P.A.

(57) ABSTRACT

The present disclosure discloses a camera lens assembly including, sequentially from an object side to an image side along an optical axis, a first lens, a second lens, a third lens, a fourth lens, a fifth lens and a sixth lens. The first lens has negative refractive power; the second lens has positive refractive power; the third lens has negative refractive power; the fourth lens has refractive power; the fifth lens has refractive power; and the sixth lens has negative refractive power. At least one of the first lens to the sixth lens has a non-rotationally symmetrical aspheric surface. An effective focal length fx in an X-axis direction of the camera lens assembly and an effective focal length fy in a Y-axis direction of the camera lens assembly satisfy $0.5 < fx/fy < 1.5$.

20 Claims, 24 Drawing Sheets

(51) Int. Cl.
    *G02B 13/00*    (2006.01)
    *G02B 27/00*    (2006.01)

(58) Field of Classification Search
    CPC .......... G02B 13/002; G02B 13/0045; G02B 13/008; G02B 13/14; G02B 13/146; G02B 13/18; G02B 27/0025
    USPC .......... 359/713, 752, 754, 756, 761
    See application file for complete search history.

(56) References Cited

U.S. PATENT DOCUMENTS

| | | | |
|---|---|---|---|
| 9,519,123 | B2 | 12/2016 | Asami |
| 9,632,288 | B2 * | 4/2017 | Asami ................ G02B 13/0045 |
| 11,480,765 | B2 * | 10/2022 | Lin .................... G02B 27/0018 |
| 2003/0214731 | A1 | 11/2003 | Hayashide |
| 2009/0073577 | A1 | 3/2009 | Jung et al. |
| 2016/0004046 | A1 | 1/2016 | Asami |
| 2016/0161719 | A1 * | 6/2016 | Son .......................... G02B 9/62 |
| | | | 359/713 |
| 2016/0341928 | A1 * | 11/2016 | Liu .......................... G02B 9/62 |
| 2017/0139183 | A1 * | 5/2017 | Li ............................ G02B 9/62 |
| 2017/0322392 | A1 | 11/2017 | Katsuragi et al. |
| 2019/0331884 | A1 * | 10/2019 | Zhang ................ G02B 13/0045 |

FOREIGN PATENT DOCUMENTS

| | | |
|---|---|---|
| CN | 105445905 A | 3/2016 |
| CN | 105445913 A | 3/2016 |
| CN | 105717609 A | 6/2016 |
| CN | 206039010 U | 3/2017 |
| CN | 107664819 A | 2/2018 |
| CN | 207516627 U | 6/2018 |
| CN | 109100854 A | 12/2018 |
| CN | 208752296 U | 4/2019 |
| KR | 2009-0030155 | * 3/2009 |

OTHER PUBLICATIONS

International Search Report mailed Aug. 7, 2019, in connection with PCT International Application No. PCT/CN2019/087375.
English Translation of Written Opinion dated Aug. 7, 2019, in connection with PCT International Application No. PCT/CN2019/087375.

* cited by examiner

CAMERA LENS ASSEMBLY

CROSS-REFERENCE TO RELATED APPLICATION

The present patent application is a continuation of International Application No. PCT/CN2019/087375, filed on May 17, 2019, which claims priority to Chinese Patent Application No. 201811032313.X, filed before the China National Intellectual Property Administration (CNIPA) on Sep. 5, 2018. All of the aforementioned patent applications are hereby incorporated by reference in their entireties.

TECHNICAL FIELD

The present disclosure relates to a camera lens assembly, and more specifically, relates to a camera lens assembly including six lenses.

BACKGROUND

In recent years, with the rapid development of the mobile phone camera field and the popularization of large-size, high-pixel Complementary Metal-Oxide Semiconductor (CMOS) or photosensitive Charge-Coupled Device (CCD) chips, major mobile phone manufacturers are pursuing thinner and miniaturized lens assemblies while putting forward strict requirements on the image quality of the lens assemblies. Currently, lens assemblies used in portable electronic products, such as mobile phones, mostly employ a six-piece structure, and their lens surfaces are rotationally symmetric (axisymmetric) aspheric surfaces. The kind of rotationally symmetric aspheric surface can be regarded as formed by a curve in the tangential plane rotating 360° around the optical axis. Therefore, the aspheric surface only has sufficient degrees of freedom in the tangential plane, and cannot correct off-axis aberrations well.

SUMMARY

The present disclosure provides a camera lens assembly that is applicable to portable electronic products and at least solves or partially solves at least one of the above disadvantages of the prior art.

In one aspect, the present disclosure provides a camera lens assembly which includes, sequentially from an object side to an image side along an optical axis, a first lens, a second lens, a third lens, a fourth lens, a fifth lens and a sixth lens. The first lens may have negative refractive power; the second lens may have positive refractive power; the third lens may have negative refractive power; the fourth lens has refractive power; the fifth lens has refractive power; and the sixth lens may have negative refractive power. At least one of the first lens to the sixth lens may have a non-rotationally symmetrical aspheric surface.

In one embodiment, an effective focal length fx in an X-axis direction of the camera lens assembly and an effective focal length fy in a Y-axis direction of the camera lens assembly may satisfy $0.5<fx/fy<1.5$.

In one embodiment, each of an object-side surface and an image-side surface of the second lens may be a convex surface.

In one embodiment, the fourth lens may have negative refractive power.

In one embodiment, the fifth lens may have positive refractive power.

In one embodiment, each of an object-side surface and an image-side surface of the fifth lens may be a convex surface.

In one embodiment, an effective focal length f5 of the fifth lens and an effective focal length f6 of the sixth lens may satisfy $0.5\ mm^{-1}<|1/f5-1/f6|<2.5\ mm^{-1}$.

In one embodiment, an effective focal length f1 of the first lens and an effective focal length f2 of the second lens may satisfy $-0.6<f2/f1<-0.4$.

In one embodiment, the first lens may have at least one non-rotationally symmetrical aspheric surface.

In one embodiment, a radius of curvature R9 of an object-side surface of the fifth lens and a radius of curvature R8 of an image-side surface of the fourth lens may satisfy $0<R9/R8<1.5$.

In one embodiment, a center thickness CT3 of the third lens along the optical axis and a center thickness CT4 of the fourth lens along the optical axis may satisfy $0.5<CT3/CT4<1$.

In one embodiment, a center thickness CT6 of the sixth lens along the optical axis and an edge thickness ET6 of the sixth lens may satisfy $0.2<CT6/ET6<1$.

In one embodiment, SAG51, being a distance along the optical axis from an intersection of an object-side surface of the fifth lens and the optical axis to a projection point of a vertex of an effective radius of the object-side surface of the fifth lens onto the optical axis, and SAG61, being a distance along the optical axis from an intersection of an object-side surface of the sixth lens and the optical axis to a projection point of a vertex of an effective radius of the object-side surface of the sixth lens onto the optical axis, may satisfy $-0.5<SAG51/SAG61<0.5$.

In one embodiment, the camera lens assembly may further include a stop, and a distance SL along the optical axis from the stop to an imaging plane of the camera lens assembly may satisfy $SL \geq 4\ mm$.

In one embodiment, a distance TTL along the optical axis from a center of an object-side surface of the first lens to an imaging plane of the camera lens assembly and half of a diagonal length ImgH of an effective pixel area on the imaging plane of the camera lens assembly may satisfy $TTL/ImgH<1.8$.

In one embodiment, a full field-of-view FOV of the camera lens may satisfy $FOV>900$.

The present disclosure employs a plurality of (for example, six) lenses, and the above camera lens assembly has at least one beneficial effect, such as miniaturization, large wide-angle, and high image quality and the like, by rationally configuring the refractive power, the surface shape, the center thickness of each lens, and the on-axis spaced interval between the lenses and the like. At the same time, by introducing a non-rotationally symmetrical aspheric surface, the off-axis tangential aberration and sagittal aberration of the camera lens assembly are corrected, and the image quality is further improved.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
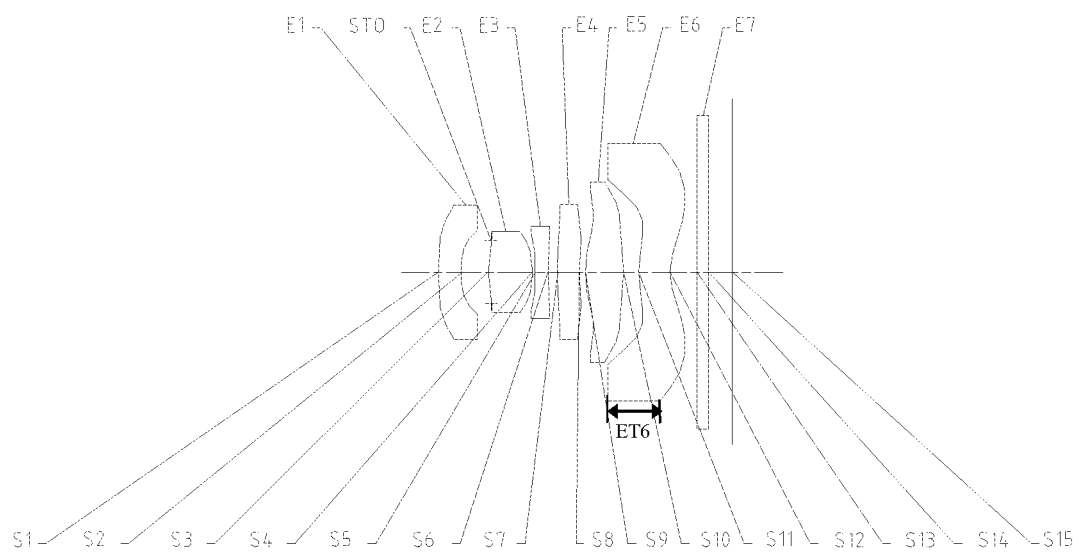
FIG. 1 illustrates a schematic structural view of a camera lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

Herein, we define the direction parallel to the optical axis as a Z-axis direction, the direction perpendicular to the Z-axis and located on the tangential plane as a Y-axis direction, and the direction perpendicular to the Z-axis and located on the sagittal plane as an X-axis direction. Except for the data related to the field-of-view, the data that is not indicated in the X or Y directions are interpreted as the numerical value in the Y direction.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The features, principles, and other aspects of the present disclosure are described in detail below with reference to the accompanying drawings and in combination with the examples.

A camera lens assembly according to an exemplary embodiment of the present disclosure may include, for example, six lenses (i.e. a first lens, a second lens, a third lens, a fourth lens, a fifth lens and a sixth lens) having refractive power. The six lenses are arranged sequentially from an object side to an image side along an optical axis. There may be an air interval between each adjacent lens.

In an exemplary embodiment, the first lens may have negative refractive power; the second lens may have positive refractive power; the third lens may have negative refractive power; the fourth lens has positive or negative refractive power; the fifth lens has positive or negative refractive power; and the sixth lens has negative refractive power. When the refractive power of the first lens is negative, it is beneficial to reduce the inclination angle of the incident light, thereby effectively sharing the large field-of-view at the object side to obtain a larger field-of-view angle. On this basis, by configuring the second lens with positive refractive power and combining it with the first lens, it is beneficial to correct aberrations in different fields-of-view. When the refractive power of the sixth lens is negative, it is beneficial to correct the field curvature of the optical system, thereby improving the image quality.

In addition, the object-side surface and/or the image-side surface of at least one of the first lens to the sixth lens may be set as a non-rotationally symmetrical aspheric surface to further improve the image quality. The non-rotationally symmetric aspheric surface is a free-form surface, which adds a non-rotationally symmetrical component to the rotationally symmetric aspheric surface. Therefore, the introduction of the non-rotationally symmetrical aspheric surface in the lens system is beneficial to effectively correcting the off-axis tangential aberration and sagittal aberration, which greatly improves the performance of the optical system.

In an exemplary embodiment, an image-side surface of the first lens may be a concave surface.

In an exemplary embodiment, an object-side surface of the second lens may be a convex surface, and an image-side surface thereof may be a convex surface.

In an exemplary embodiment, the fourth lens may have negative refractive power, and at least one of an object-side surface and an image-side surface of the fourth lens may be a concave surface. Optionally, the image-side surface of the fourth lens is a concave surface.

In an exemplary embodiment, the fifth lens may have positive refractive power, an object-side surface thereof may be a convex surface, and an image-side surface thereof may be a convex surface.

In an exemplary embodiment, an image-side surface of the sixth lens may be a concave surface.

In an exemplary embodiment, the camera lens assembly according to the present disclosure may satisfy: $0.5<fx/fy<1.5$, where fx is an effective focal length in an X-axis direction of the camera lens assembly, and fy is an effective focal length in a Y-axis direction of the camera lens assembly. More specifically, fx and fy may further satisfy: $0.86 \leq fx/fy \leq 1.24$. By rationally configuring the focal length ratio in the X-axis and Y-axis directions, it is beneficial to improve the degree of freedom of the free-form surface in the two directions, and optimize the correction effect of the system on the off-axis aberration. At the same time, it is beneficial to control the aberration and various parameters of the optical system within a more appropriate range, and finally obtain high-quality images.

In an exemplary embodiment, the camera lens assembly according to the present disclosure may satisfy: $FOV>90°$, where FOV is a full field-of-view of the camera lens assembly. More specifically, FOV may further satisfy: $FOV>100°$, for example, $110.4° \leq FOV \leq 120.8°$. Satisfying the conditional expression $FOV>90°$ is beneficial to obtaining a larger field-of-view and improving the ability of the optical system to collect object information.

In an exemplary embodiment, the camera lens assembly according to the present disclosure may satisfy: $TTL/ImgH<1.8$, where TTL is a distance along the optical axis from a center of an object-side surface of the first lens to an imaging plane of the camera lens assembly, and ImgH is half of a diagonal length of an effective pixel area on the imaging plane of the camera lens assembly. More specifically, TTL and ImgH may further satisfy: $1.62 \leq TTL/ImgH \leq 1.79$. By constraining the ratio of TTL and ImgH, ultra-thin and high image quality of the camera lens assembly are achieved.

In application, the effective focal length of each lens may also be reasonably optimized. For example, an effective focal length f2 of the second lens and an effective focal length f1 of the first lens may satisfy $-0.6<f2/f1<-0.4$. More specifically, f2 and f1 may further satisfy: $-0.58 \leq f2/f1 \leq -0.46$. As another example, an effective focal length f5 of the fifth lens and an effective focal length f6 of the sixth lens may satisfy $0.5\ mm^{-1}<|1/f5-1/f6|<2.5\ mm^{-1}$. More specifically, f5 and f6 may further satisfy: $0.60\ mm^{-1} \leq |1/f5-1/f6| \leq 2.29\ mm^{-1}$. By rationally configuring the refractive power of each lens, it is beneficial to correct various aberrations and improve the image quality of the camera lens assembly.

In an exemplary embodiment, the camera lens assembly according to the present disclosure may satisfy: $0<R9/R8<1.5$, where R9 is a radius of curvature of an object-side surface of the fifth lens, and R8 is a radius of curvature of an image-side surface of the fourth lens. More specifically, R9 and R8 may further satisfy: $0.36 \leq R9/R8 \leq 1.28$. By rationally configuring the curvature radii of the object-side surface of the fifth lens and the image-side surface of the fourth lens, the spherical aberration of the system may be effectively eliminated, thereby obtaining high-definition images.

In an exemplary embodiment, the camera lens assembly according to the present disclosure may satisfy: $0.5<CT3/CT4<1$, where CT3 is a center thickness of the third lens along the optical axis, and CT4 is a center thickness of the fourth lens along the optical axis. More specifically, CT3 and CT4 may further satisfy: $0.57 \leq CT3/CT4 \leq 0.94$. By rationally configuring the center thickness of the lens, the thickness sensitivity of the lens may be effectively reduced and the field curvature may be corrected.

In an exemplary embodiment, the camera lens assembly according to the present disclosure may satisfy: $0.2<CT6/ET6<1$, where CT6 is a center thickness of the sixth lens along the optical axis, and ET6 is an edge thickness of the sixth lens. More specifically, CT6 and ET6 may further satisfy: $0.38 \leq CT6/ET6 \leq 0.90$. By rationally configuring the thickness ratio of the lens, it is beneficial to meet the workability and process requirements of the lens assembly.

In an exemplary embodiment, the camera lens assembly according to the present disclosure may satisfy: $-0.5<SAG51/SAG61<0.5$, where SAG51 is a distance along the optical axis from an intersection of an object-side surface of the fifth lens and the optical axis to a projection point of a vertex of an effective radius of the object-side surface of the fifth lens onto the optical axis, and SAG61 is a distance along the optical axis from an intersection of an object-side surface of the sixth lens and the optical axis to a projection point of a vertex of an effective radius of the object-side surface of the sixth lens onto the optical axis. More specifically, SAG51 and SAG61 may further satisfy: −0.36≤SAG51/SAG61≤0.10. By rationally configuring the surface shape, the field curvature of the system may be effectively eliminated to ensure the image quality.

In an exemplary embodiment, the above camera lens assembly may further include a stop to improve the image quality of the lens assembly. Optionally, the stop may be disposed between the first lens and the second lens. Optionally, a distance SL along the optical axis from the stop to an imaging plane of the camera lens assembly may satisfy SL≥4 mm. More specifically, SL may further satisfy: 4.01 mm≤SL≤4.24 mm. By reasonably configuring the position of the stop, the system tolerance sensitivity may be effectively reduced, and the design yield may be improved.

Optionally, the above camera lens assembly may further include an optical filter for correcting the color deviation and/or a protective glass for protecting the photosensitive element located on an imaging plane.

The camera lens assembly according to the above embodiments of the present disclosure may employ a plurality of lenses, such as six lenses as described above. By properly configuring the refractive power of each lens, the surface shape, the center thickness of each lens, and spaced intervals along the optical axis between the lenses, the size and the sensitivity of the lens assembly may be effectively reduced, and the workability of the lens assembly may be improved, such that the camera lens assembly is more advantageous for production processing and may be applied to portable electronic products. By introducing a non-rotationally symmetrical aspheric surface to correct the off-axis tangential aberration and sagittal aberration of the camera lens assembly, the image quality may be further improved.

In the embodiments of the present disclosure, the surface of each lens is mostly an aspheric surface. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality.

However, it will be understood by those skilled in the art that the number of lenses constituting the camera lens assembly may be varied to achieve the various results and advantages described in this specification without departing from the technical solution claimed by the present disclosure. For example, although the embodiment is described by taking six lenses as an example, the camera lens assembly is not limited to include six lenses. The camera lens assembly may also include other numbers of lenses if desired. Some specific examples of a camera lens assembly applicable to the above embodiment will be further described below with reference to the accompanying drawings.

Example 1

A camera lens assembly according to example 1 of the present disclosure is described below with reference to FIG. 1 and FIG. 2. FIG. 1 shows a schematic structural view of the camera lens assembly according to example 1 of the present disclosure.

As shown in FIG. 1, the camera lens assembly according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 1 shows the surface type, the radius of curvature X, the radius of curvature Y, the thickness, the material, the conic coefficient X and the conic coefficient Y of each lens of the camera lens assembly in example 1, wherein the units for the radius of curvature X, the radius of curvature Y and the thickness are millimeter (mm).

TABLE 1

| Surface number | Surface type | Radius of curvature Y | Radius of curvature X | Thickness | Material Refractive index | Abbe number | Conic coefficient Y | Conic coefficient X |
|---|---|---|---|---|---|---|---|---|
| OBJ | Spherical | Infinite | | Infinite | | | | |
| S1 | Aspheric | −24.5214 | | 0.3994 | 1.54 | 55.7 | 95.0000 | |
| S2 (AAS surface) | Aspheric | 2.5461 | 2.5509 | 0.5213 | | | 4.3820 | 5.1930 |
| STO | Spherical | Infinite | | −0.0444 | | | | |
| S3 | Aspheric | 2.6019 | | 0.7705 | 1.55 | 56.1 | −2.3898 | |
| S4 | Aspheric | −1.7789 | | 0.0508 | | | 3.2895 | |
| S5 | Aspheric | −16.5301 | | 0.2236 | 1.65 | 20.4 | −39.9792 | |
| S6 | Aspheric | 4.5376 | | 0.1589 | | | −15.7980 | |
| S7 | Aspheric | 4.9051 | | 0.3917 | 1.55 | 56.1 | −82.6105 | |
| S8 | Aspheric | 2.6507 | | 0.1064 | | | −46.3730 | |
| S9 | Aspheric | 2.1591 | | 0.6696 | 1.55 | 56.1 | −5.7452 | |

TABLE 1-continued

| Surface number | Surface type | Radius of curvature Y | Radius of curvature X | Thickness | Material Refractive index | Material Abbe number | Conic coefficient Y | Conic coefficient X |
|---|---|---|---|---|---|---|---|---|
| S10 | Aspheric | −2.1209 | | 0.2647 | | | −0.3644 | |
| S11 | Aspheric | 2.0817 | | 0.5483 | 1.65 | 20.4 | −1.5099 | |
| S12 | Aspheric | 1.0591 | | 0.4723 | | | −2.3290 | |
| S13 | Spherical | Infinite | | 0.2100 | 1.52 | 64.2 | | |
| S14 | Spherical | Infinite | | 0.4151 | | | | |
| S15 | Spherical | Infinite | | | | | | |

As can be seen from Table 1, the object-side surface S1 of the first lens E1, the object-side surface and the image-side surface of any one of the second lens E2, the third lens E3, the fourth lens E4, the fifth lens E5 and the sixth lens E6 are aspheric. In this example, the surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1): k is a conic coefficient (given in the above Table 1): Ai is a correction coefficient for the i-th order of the aspheric surface. Table 2 below shows high-order coefficients A4, A6, A8, A10, A12, A14, A16, A18 and A20 applicable to each aspheric surface S1, S3 to S12 in example 1.

TABLE 2

| Surface number | A4 | A6 | A8 | A10 | A12 |
|---|---|---|---|---|---|
| S1 | 3.4883E−01 | −3.7400E−01 | 4.5140E−01 | −4.0373E−01 | 2.4357E−01 |
| S3 | 6.0759E−02 | −2.0199E−01 | 7.0650E−01 | −5.0820E+00 | 1.1610E+01 |
| S4 | −3.7730E−01 | 2.0663E+00 | −1.0925E+01 | 4.7761E+01 | −1.6386E+02 |
| S5 | −5.0076E−01 | 1.8857E+00 | −8.2996E+00 | 3.1387E+01 | −9.6578E+01 |
| S6 | −2.0905E−01 | 6.1077E−01 | −2.1467E+00 | 8.4274E+00 | −2.7426E+01 |
| S7 | −8.3871E−02 | 1.3327E−01 | 2.0923E−01 | −1.0249E+00 | 1.5948E+00 |
| S8 | 2.9171E−02 | −1.0173E+00 | 2.6141E+00 | −3.9895E+00 | 3.8222E+00 |
| S9 | 1.84E−01 | −6.61E−01 | 1.09E+00 | −1.28E+00 | 8.70E−01 |
| S10 | 3.9914E−01 | −3.6763E−01 | 3.6349E−01 | −5.7446E−01 | 6.1681E−01 |
| S11 | −1.2745E−01 | −1.2989E−01 | 8.2787E−02 | −2.3859E−02 | −4.1156E−03 |
| S12 | −2.1299E−01 | 1.2118E−01 | −7.0156E−02 | 3.5489E−02 | −1.3322E−02 |

| Surface number | A14 | A16 | A18 | A20 |
|---|---|---|---|---|
| S1 | −9.4157E−02 | 1.6349E−02 | 0.0000E+00 | 0.0000E+00 |
| S3 | 6.1210E+00 | −1.0204E+02 | 2.1548E+02 | −1.6517E+02 |
| S4 | 3.9380E+02 | −6.0415E+02 | 5.2717E+02 | −1.9802E+02 |
| S5 | 2.1400E+02 | −3.0702E+02 | 2.5495E+02 | −9.2901E+01 |
| S6 | 6.0314E+01 | −8.1636E+01 | 6.1633E+01 | −1.9776E+01 |
| S7 | −1.1903E+00 | 3.0132E−01 | 8.9813E−02 | −4.5562E−02 |
| S8 | −2.0433E+00 | 4.7039E−01 | 1.4816E−02 | −1.7250E−02 |
| S9 | −2.69E−01 | −1.98E−03 | 2.10E−02 | −3.61E−03 |
| S10 | −3.8244E−01 | 1.3649E−01 | −2.6187E−02 | 2.0904E−03 |
| S11 | 7.1269E−03 | −1.5148E−03 | −2.1396E−04 | 6.8112E−05 |
| S12 | 3.3866E−03 | −5.4738E−04 | 5.0630E−05 | −2.0304E−06 |

It can also be seen from Table 1 that the image-side surface S2 of the first lens E1 is a non-rotationally symmetrical aspheric surface (ie, AAS surface), the surface shape of the non-rotationally symmetrical aspheric surface may be defined by using, but not limited to, the following non-rotationally symmetrical aspheric surface formula:

$$z = \frac{(CUX)x^2 + (CUY)y^2}{1 + \sqrt{1 - (1+KX)(CUX)^2 x^2 - (1+KY)(CUY)^2 y^2}} + \quad (2)$$
$$AR\{(1-AP)x^2 + (1+AP)y^2\}^2 + BR\{(1-BP)x^2 + (1+BP)y^2\}^3 +$$
$$CR\{(1-CP)x^2 + (1+CP)y^2\}^4 + DR\{(1-DP)x^2 + (1+DP)y^2\}^5$$

Figure 3:
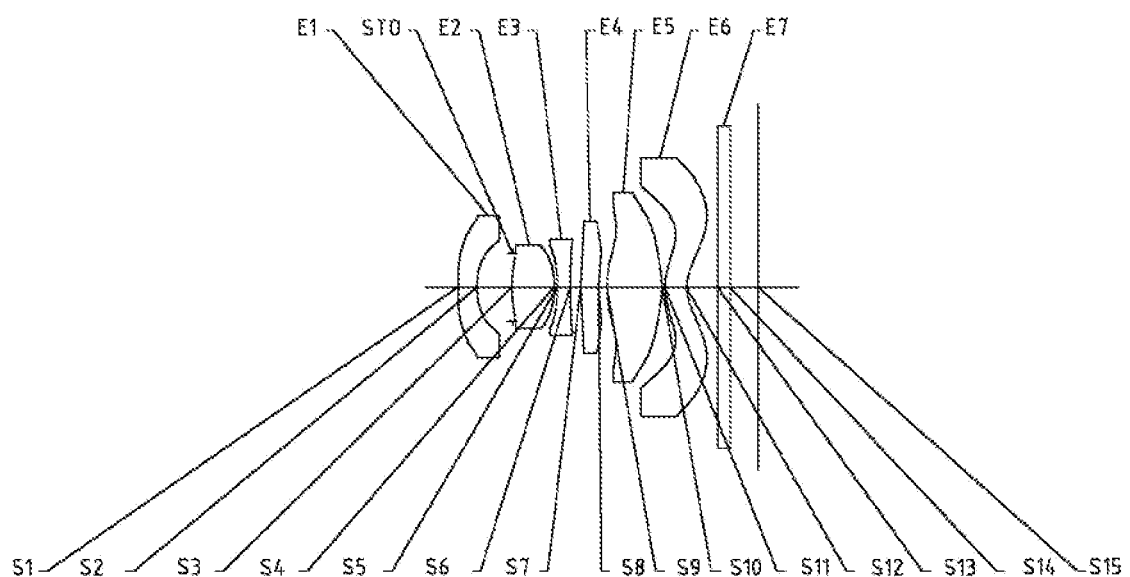
FIG. 3 illustrates a schematic structural view of a camera lens assembly according to example 2 of the present disclosure.

Where, z is a vector height of the surface in a direction parallel to the Z axis: CUX and CUY are the curvatures of the vertices in the X-axis and Y-axis directions (=1/radius of curvature), respectively: KX, KY are the conic coefficients in the X-axis and Y-axis directions, respectively: AR, BR, CR, and DR are the 4th, 6th, 8th, and 10th order coefficients of the rotationally symmetric component of the aspheric surface, respectively: AP, BP, CP, and DP are the 4th, 6th, 8th, and 10th order coefficients of the non-rotationally symmetric component of the aspheric surface, respectively. Table 3 below shows the AR, BR, CR, DR coefficients and AP, BP, CP, and DP coefficients applicable to the non-rotationally symmetric aspheric surface S1 in example 1.

for the purpose of brevity, the description of parts similar to those in example 1 will be omitted. FIG. 3 shows a schematic structural view of the camera lens assembly according to example 2 of the present disclosure.

As shown in FIG. 3, the camera lens assembly according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11

TABLE 3

| AAS surface | AR | BR | CR | DR | AP | BP | CP | DP |
|---|---|---|---|---|---|---|---|---|
| S2 | 7.0410E−01 | −1.2685E+00 | 3.4479E+00 | −2.9618E+00 | −1.6275E−04 | −5.6552E−04 | 3.2717E−03 | 4.0997E−03 |

Table 4 shows effective focal lengths f1 to f6 of respective lens, an effective focal length fx in an X-axis direction of the camera lens assembly, an effective focal length fy in a Y-axis direction of the camera lens assembly, a total optical length TTL of the camera lens assembly (that is, the distance along the optical axis from the center of the object-side surface S1 of the first lens E1 to the imaging plane S15), half of a diagonal length ImgH of an effective pixel area on the imaging plane S15, and half of a maximal field-of-view HFOV in example 1.

TABLE 4

| f1 (mm) | −4.28 | fx (mm) | 2.20 |
|---|---|---|---|
| f2 (mm) | 2.06 | fy (mm) | 2.20 |
| f3 (mm) | −5.32 | TTL (mm) | 5.19 |
| f4 (mm) | −11.25 | ImgH (mm) | 3.03 |
| f5 (mm) | 2.07 | HFOV (°) | 60.2 |
| f6 (mm) | −4.12 | | |

Figure 2:
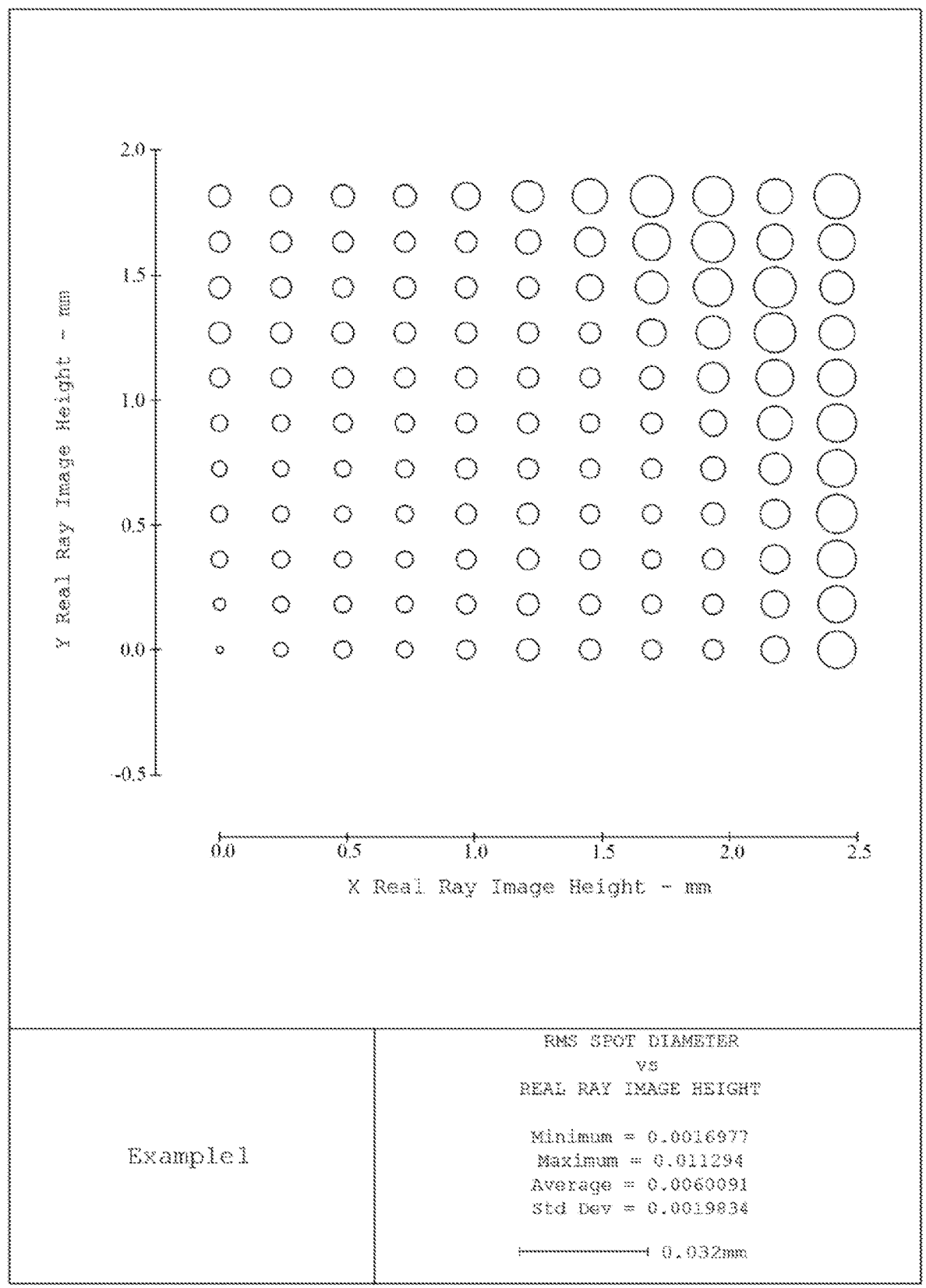
FIG. 2 schematically shows root mean square (RMS) spot diameter of the camera lens assembly of the example 1 in a first quadrant.

FIG. 2 illustrates a size distribution of an RMS spot diameter of the camera lens assembly according to example 1 at positions with different image heights in a first quadrant. It can be seen from FIG. 2 that the camera lens assembly provided in example 1 may achieve good image quality.

Example 2

A camera lens assembly according to example 2 of the present disclosure is described below with reference to FIG. 3 and FIG. 4. In this example and the following examples, thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 5 shows the surface type, the radius of curvature X, the radius of curvature Y, the thickness, the material, the conic coefficient X and the conic coefficient Y of each lens of the camera lens assembly in example 2, wherein the units for the radius of curvature X, the radius of curvature Y and the thickness are millimeter (mm). Table 6 shows high-order coefficients applicable to each aspheric surface in example 2, wherein the surface shape of each aspheric surface may be defined by the formula (1) given in the above example 1. Table 7 shows high-order coefficients applicable to the rotationally symmetrical component and the non-rotationally symmetrical component of the non-rotationally symmetrical aspheric surface S7 in example 2, wherein the surface shape of the non-rotationally symmetrical aspheric surface may be defined by the formula (2) given in the above example 1. Table 8 shows effective focal lengths f1 to f6 of respective lens, an effective focal length fx in an X-axis direction of the camera lens assembly, an effective focal length fy in a Y-axis direction of the camera lens assembly, a total optical length TTL of the camera lens assembly, half of a diagonal length ImgH of an effective pixel area on the imaging plane S15, and half of a maximal field-of-view HFOV in example 2.

TABLE 5

| Surface number | Surface type | Radius of curvature Y | Radius of curvature X | Thickness | Material Refractive index | Abbe number | Conic coefficient Y | Conic coefficient X |
|---|---|---|---|---|---|---|---|---|
| OBJ | Spherical | Infinite | | Infinite | | | | |
| S1 | Aspheric | 14.0816 | | 0.3168 | 1.54 | 55.7 | 4.7753 | |
| S2 | Aspheric | 1.6422 | | 0.5934 | | | −2.0748 | |
| STO | Spherical | Infinite | | −0.0123 | | | | |
| S3 | Aspheric | 2.0701 | | 0.7161 | 1.55 | 56.1 | −5.0255 | |
| S4 | Aspheric | −1.7636 | | 0.0500 | | | 3.5129 | |
| S5 | Aspheric | −3.5252 | | 0.2200 | 1.65 | 20.4 | −3.2603 | |
| S6 | Aspheric | 7.9062 | | 0.1735 | | | 23.2041 | |
| S7 (AAS surface) | Aspheric | 2.7990 | 2.8627 | 0.3018 | 1.55 | 56.1 | −95.0000 | −85.2840 |
| S8 | Aspheric | 1.8306 | | 0.1361 | | | −34.4651 | |
| S9 | Aspheric | 1.8412 | | 0.9249 | 1.55 | 56.1 | −5.3663 | |
| S10 | Aspheric | −1.5232 | | 0.0448 | | | −0.4720 | |
| S11 | Aspheric | 1.0346 | | 0.3626 | 1.65 | 20.4 | −2.3947 | |
| S12 | Aspheric | 0.6756 | | 0.5248 | | | −2.5213 | |
| S13 | Spherical | Infinite | | 0.2100 | 1.52 | 64.2 | | |
| S14 | Spherical | Infinite | | 0.4688 | | | | |
| S15 | Spherical | Infinite | | | | | | |

TABLE 6

| Surface number | A4 | A6 | A8 | A10 | A12 |
|---|---|---|---|---|---|
| S1 | 3.5873E−01 | −4.2986E−01 | 5.2217E−01 | −4.7761E−01 | 3.0327E−01 |
| S2 | 7.2038E−01 | −1.2648E+00 | 5.3068E+00 | −1.6336E+01 | 3.4257E+01 |
| S3 | 4.0313E−02 | −3.1199E−01 | 1.1589E+00 | −7.5418E+00 | 1.4448E+01 |
| S4 | −4.8803E−01 | 2.2466E+00 | −1.2296E+01 | 5.6690E+01 | −2.0391E+02 |
| S5 | −5.4768E−01 | 2.1388E+00 | −9.4758E+00 | 3.7596E+01 | −1.2018E+02 |
| S6 | −2.0496E−01 | 7.0137E−01 | −2.4269E+00 | 1.0050E+01 | −3.4129E+01 |
| S8 | −8.5553E−03 | −1.1182E+00 | 3.0071E+00 | −4.7691E+00 | 4.7563E+00 |
| S9 | 1.84E−01 | −7.27E−01 | 1.26E+00 | −1.53E+00 | 1.08E+00 |
| S10 | 4.2477E−01 | −4.0236E−01 | 4.1891E−01 | −6.8656E−01 | 7.6766E−01 |
| S11 | −1.6094E−01 | −1.6876E−01 | 3.6216E−01 | −5.6187E−01 | 5.3226E−01 |
| S12 | −2.4004E−01 | 1.3475E−01 | −8.0451E−02 | 4.2458E−02 | −1.6577E−02 |

| Surface number | A14 | A16 | A18 | A20 |
|---|---|---|---|---|
| S1 | −1.2200E−01 | 2.1848E−02 | 0.0000E+00 | 0.0000E+00 |
| S2 | −3.9424E+01 | 1.7353E+01 | 0.0000E+00 | 0.0000E+00 |
| S3 | 7.9257E+00 | −1.3749E+02 | 3.0211E+02 | −2.4095E+02 |
| S4 | 5.0991E+02 | −8.1400E+02 | 7.3908E+02 | −2.8888E+02 |
| S5 | 2.7709E+02 | −4.1367E+02 | 3.5744E+02 | −1.3553E+02 |
| S6 | 7.8098E+01 | −1.0999E+02 | 8.6409E+01 | −2.8849E+01 |
| S8 | −2.6457E+00 | 6.3382E−01 | 2.0794E−02 | −2.5159E−02 |
| S9 | −3.48E−01 | −2.67E−03 | 2.95E−02 | −5.26E−03 |
| S10 | −4.9519E−01 | 1.8390E−01 | −3.6715E−02 | 3.0494E−03 |
| S11 | −2.8698E−01 | 8.6804E−02 | −1.3706E−02 | 8.7573E−04 |
| S12 | 4.3849E−03 | −7.3758E−04 | 7.0968E−05 | −2.9647E−06 |

TABLE 7

| AAS surface | AR | BR | CR | DR | AP | BP | CP | DP |
|---|---|---|---|---|---|---|---|---|
| S7 | −1.2581E−01 | 1.8827E−01 | −1.2542E−01 | 3.0459E−02 | −3.0550E−02 | −2.7875E−02 | −3.0029E−02 | −3.6723E−02 |

TABLE 8

| | | | |
|---|---|---|---|
| f1 (mm) | −3.49 | fx (mm) | 1.83 |
| f2 (mm) | 1.87 | fy (mm) | 1.82 |
| f3 (mm) | −3.63 | TTL (mm) | 5.08 |
| f4 (mm) | −10.89 | ImgH (mm) | 3.03 |
| f5 (mm) | 1.69 | HFOV (°) | 60.1 |
| f6 (mm) | −4.90 | | |

Figure 4:
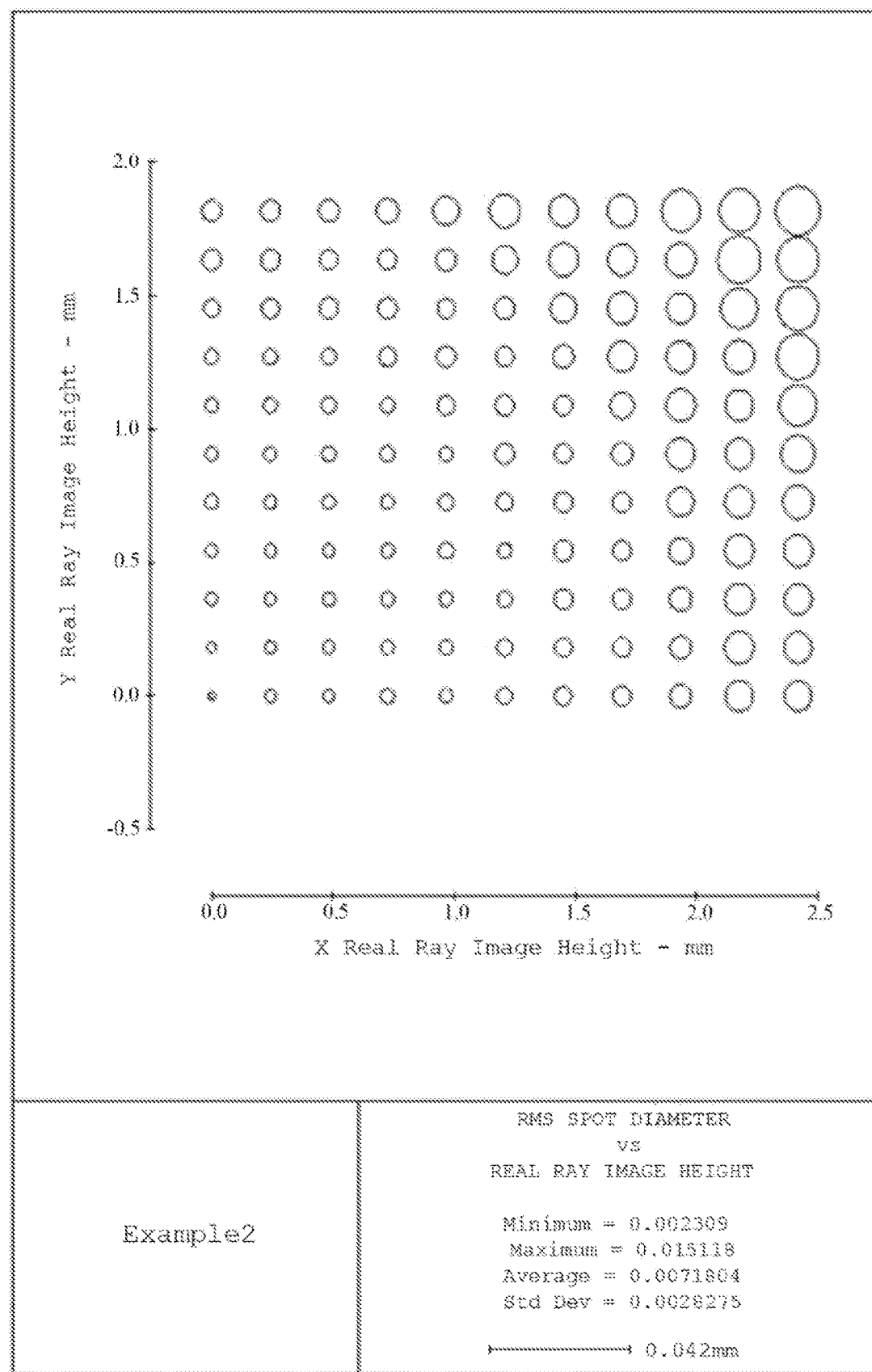
FIG. 4 schematically shows RMS spot diameter of the camera lens assembly of the example 2 in a first quadrant.

FIG. 4 illustrates a size distribution of an RMS spot diameter of the camera lens assembly according to example 2 at positions with different image heights in a first quadrant. It can be seen from FIG. 4 that the camera lens assembly provided in example 2 may achieve good image quality.

Example 3

Figure 5:
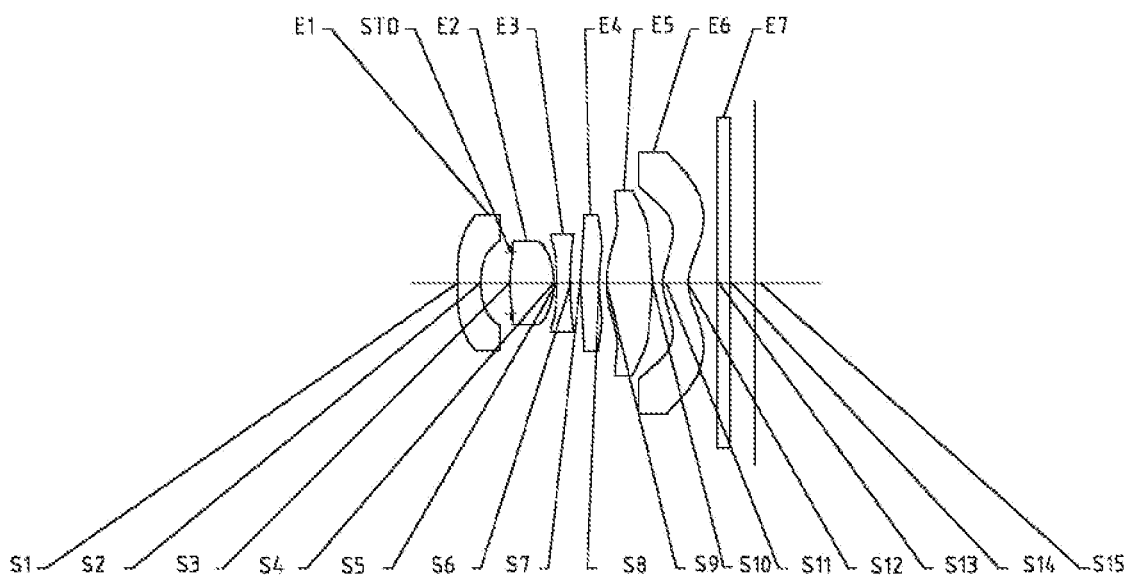
FIG. 5 illustrates a schematic structural view of a camera lens assembly according to example 3 of the present disclosure.

A camera lens assembly according to example 3 of the present disclosure is described below with reference to FIG. 5 and FIG. 6. FIG. 5 shows a schematic structural view of the camera lens assembly according to example 3 of the present disclosure.

As shown in FIG. 5, the camera lens assembly according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 9 shows the surface type, the radius of curvature X, the radius of curvature Y, the thickness, the material, the conic coefficient X and the conic coefficient Y of each lens of the camera lens assembly in example 3, wherein the units for the radius of curvature X, the radius of curvature Y and the thickness are millimeter (mm). Table 10 shows high-order coefficients applicable to each aspheric surface in example 3, wherein the surface shape of each aspheric surface may be defined by the formula (1) given in the above example 1. Table 11 shows high-order coefficients applicable to the rotationally symmetrical component and the non-rotationally symmetrical component of the non-rotationally symmetrical aspheric surface S8 in example 3, wherein the surface shape of the non-rotationally symmetrical aspheric surface may be defined by the formula (2) given in the above example 1. Table 12 shows effective focal lengths f1 to f6 of respective lens, an effective focal length fx in an X-axis direction of the camera lens assembly, an effective focal length fy in a Y-axis direction of the camera lens assembly, a total optical length TTL of the camera lens assembly, half of a diagonal length ImgH of an effective pixel area on the imaging plane S15, and half of a maximal field-of-view HFOV in example 3.

TABLE 9

| Surface number | Surface type | Radius of curvature Y | Radius of curvature X | Thickness | Material Refractive index | Abbe number | Conic coefficient Y | Conic coefficient X |
|---|---|---|---|---|---|---|---|---|
| OBJ | Spherical | Infinite | | Infinite | | | | |
| S1 | Aspheric | −69.1548 | | 0.3847 | 1.54 | 55.7 | −95.0000 | |
| S2 | Aspheric | 1.9616 | | 0.5067 | | | 1.9817 | |
| STO | Spherical | Infinite | | −0.0210 | | | | |
| S3 | Aspheric | 2.4205 | | 0.7346 | 1.55 | 56.1 | −4.8256 | |
| S4 | Aspheric | −1.6345 | | 0.0500 | | | 3.2451 | |
| S5 | Aspheric | −13.9210 | | 0.2200 | 1.65 | 20.4 | 95.0000 | |
| S6 | Aspheric | 3.6636 | | 0.1728 | | | −13.6726 | |
| S7 | Aspheric | 2.5198 | | 0.3094 | 1.55 | 56.1 | −95.0000 | |
| S8 (AAS surface) | Aspheric | 1.4564 | 1.4153 | 0.1274 | | | −38.2869 | −40.8458 |
| S9 | Aspheric | 1.8659 | | 0.7665 | 1.55 | 56.1 | −3.1539 | |
| S10 | Aspheric | −2.1463 | | 0.1744 | | | 0.0443 | |
| S11 | Aspheric | 0.8969 | | 0.4171 | 1.65 | 20.4 | −3.2104 | |
| S12 | Aspheric | 0.6495 | | 0.4862 | | | −3.8260 | |
| S13 | Spherical | Infinite | | 0.2100 | 1.52 | 64.2 | | |
| S14 | Spherical | Infinite | | 0.4302 | | | | |
| S15 | Spherical | Infinite | | | | | | |

TABLE 10

| Surface number | A4 | A6 | A8 | A10 | A12 |
|---|---|---|---|---|---|
| S1 | 3.8477E−01 | −4.1643E−01 | 5.1159E−01 | −4.8184E−01 | 3.0713E−01 |
| S2 | 1.4136E+00 | −1.0804E+01 | 7.3594E+01 | −2.7713E+02 | 5.8414E+02 |
| S3 | 3.6927E−02 | −3.1880E−01 | 1.1277E+00 | −7.9376E+00 | 1.4448E+01 |
| S4 | −4.5931E−01 | 2.2611E+00 | −1.2505E+01 | 5.7004E+01 | −2.0391E+02 |
| S5 | −5.5511E−01 | 2.0732E+00 | −9.5429E+00 | 3.7575E+01 | −1.2018E+02 |
| S6 | −2.1595E−01 | 6.8449E−01 | −2.4626E+00 | 1.0075E+01 | −3.4117E+01 |
| S7 | −9.6479E−02 | 1.4307E−01 | 2.4643E−01 | −1.2190E+00 | 1.9854E+00 |
| S9 | 1.98E−01 | −7.33E−01 | 1.25E+00 | −1.53E+00 | 1.08E+00 |
| S10 | 4.0254E−01 | −4.0458E−01 | 4.1893E−01 | −6.8650E−01 | 7.6769E−01 |
| S11 | −3.8830E−01 | 6.3798E−01 | −1.0904E+00 | 9.8650E−01 | −4.8769E−01 |
| S12 | −2.2594E−01 | 1.3230E−01 | −8.0654E−02 | 4.2465E−02 | −1.6572E−02 |

| Surface number | A14 | A16 | A18 | A20 |
|---|---|---|---|---|
| S1 | −1.1982E−01 | 2.0513E−02 | 0.0000E+00 | 0.0000E+00 |
| S2 | −6.3789E+02 | 2.7754E+02 | 0.0000E+00 | 0.0000E+00 |
| S3 | 7.9257E+00 | −1.3749E+02 | 3.0211E+02 | −2.4095E+02 |
| S4 | 5.0991E+02 | −8.1400E+02 | 7.3908E+02 | −2.8888E+02 |
| S5 | 2.7709E+02 | −4.1367E+02 | 3.5744E+02 | −1.3553E+02 |
| S6 | 7.8098E+01 | −1.0999E+02 | 8.6409E+01 | −2.8849E+01 |
| S7 | −1.5444E+00 | 4.0431E−01 | 1.2610E−01 | −6.6469E−02 |
| S9 | −3.48E−01 | −2.63E−03 | 2.95E−02 | −5.25E−03 |
| S10 | −4.9516E−01 | 1.8390E−01 | −3.6716E−02 | 3.0486E−03 |
| S11 | 1.2195E−01 | −7.7232E−03 | −2.5363E−03 | 3.8858E−04 |
| S12 | 4.3860E−03 | −7.3743E−04 | 7.0975E−05 | −2.9673E−06 |

TABLE 11

| AAS surface | AR | BR | CR | DR | AP | BP | CP | DP |
|---|---|---|---|---|---|---|---|---|
| S8 | −4.0350E−02 | −4.3873E−01 | 5.3746E−01 | −1.7878E−01 | 1.1170E−01 | −1.3690E−02 | −6.9713E−03 | −4.8171E−03 |

TABLE 12

| f1 (mm) | −3.55 | fx (mm) | 1.92 |
|---|---|---|---|
| f2 (mm) | 1.91 | fy (mm) | 1.87 |
| f3 (mm) | −4.33 | TTL (mm) | 5.02 |
| f4 (mm) | −7.05 | ImgH (mm) | 3.03 |
| f5 (mm) | 1.96 | HFOV (°) | 60.3 |
| f6 (mm) | −10.85 | | |

Figure 6:
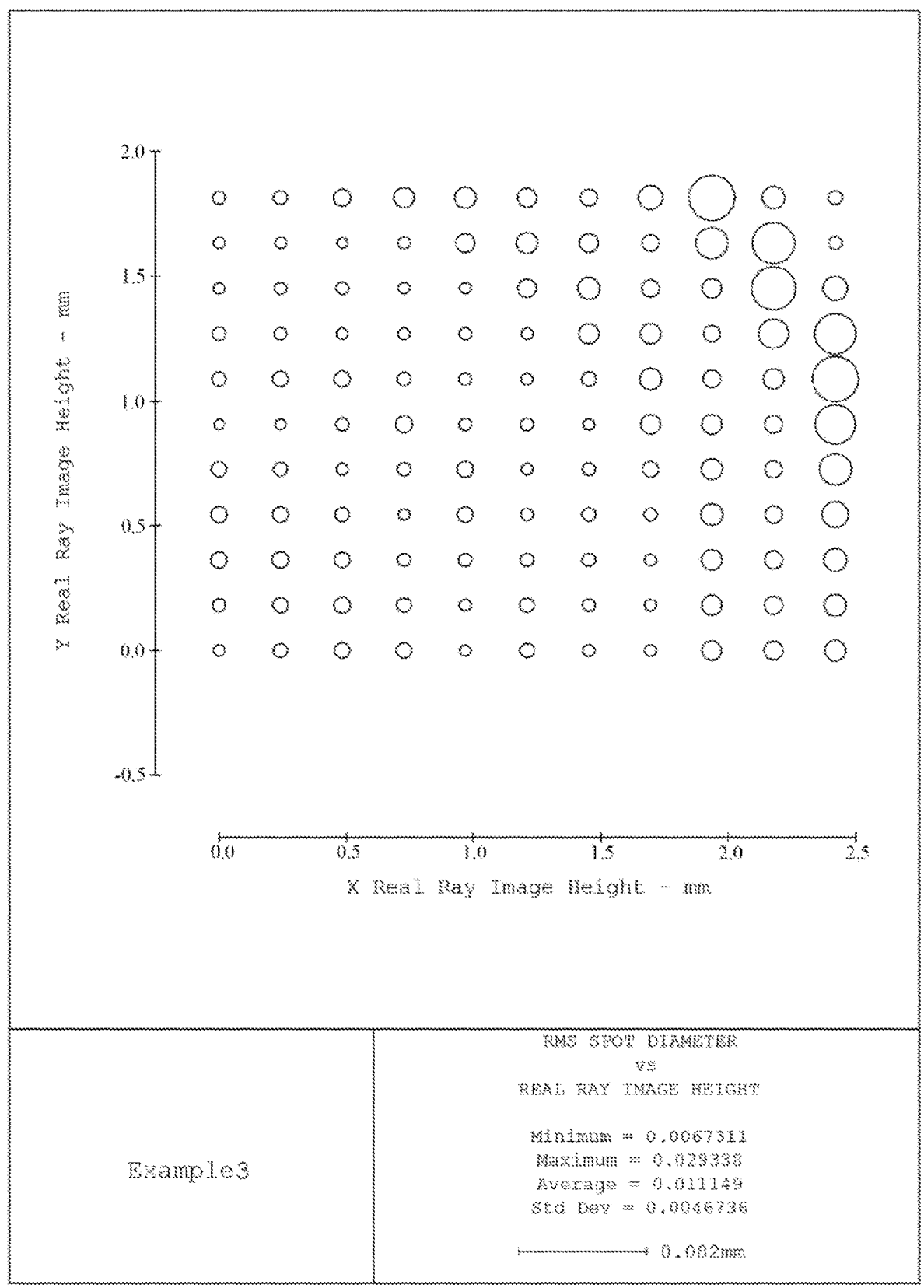
FIG. 6 schematically shows RMS spot diameter of the camera lens assembly of the example 3 in a first quadrant.

FIG. 6 illustrates a size distribution of an RMS spot diameter of the camera lens assembly according to example 3 at positions with different image heights in a first quadrant. It can be seen from FIG. 6 that the camera lens assembly provided in example 3 may achieve good image quality.

Example 4

Figure 7:
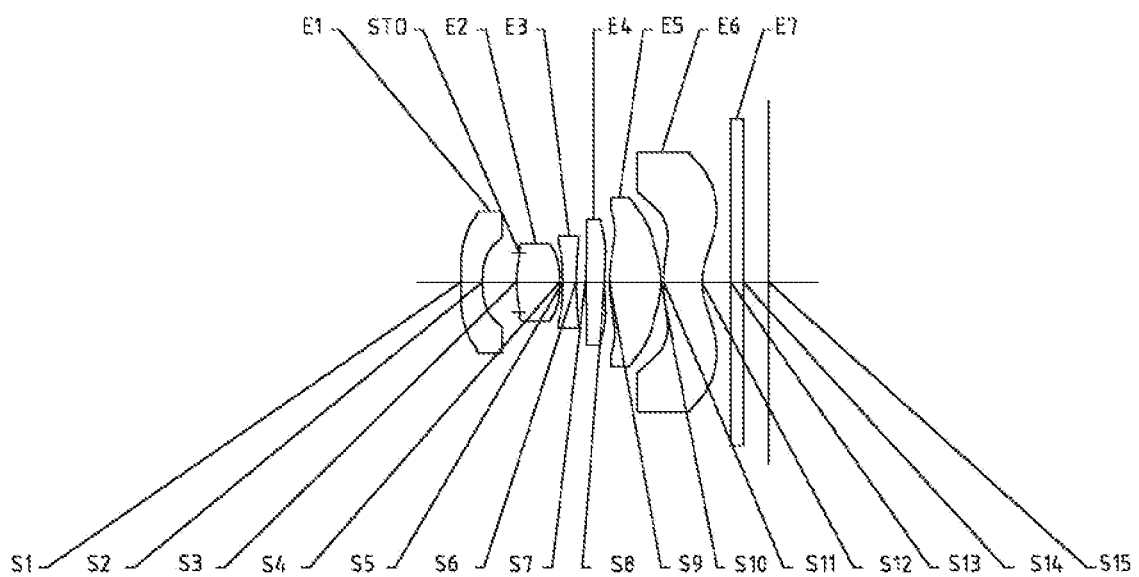
FIG. 7 illustrates a schematic structural view of a camera lens assembly according to example 4 of the present disclosure.

A camera lens assembly according to example 4 of the present disclosure is described below with reference to FIG. 7 and FIG. 8. FIG. 7 shows a schematic structural view of the camera lens assembly according to example 4 of the present disclosure.

Figure 9:
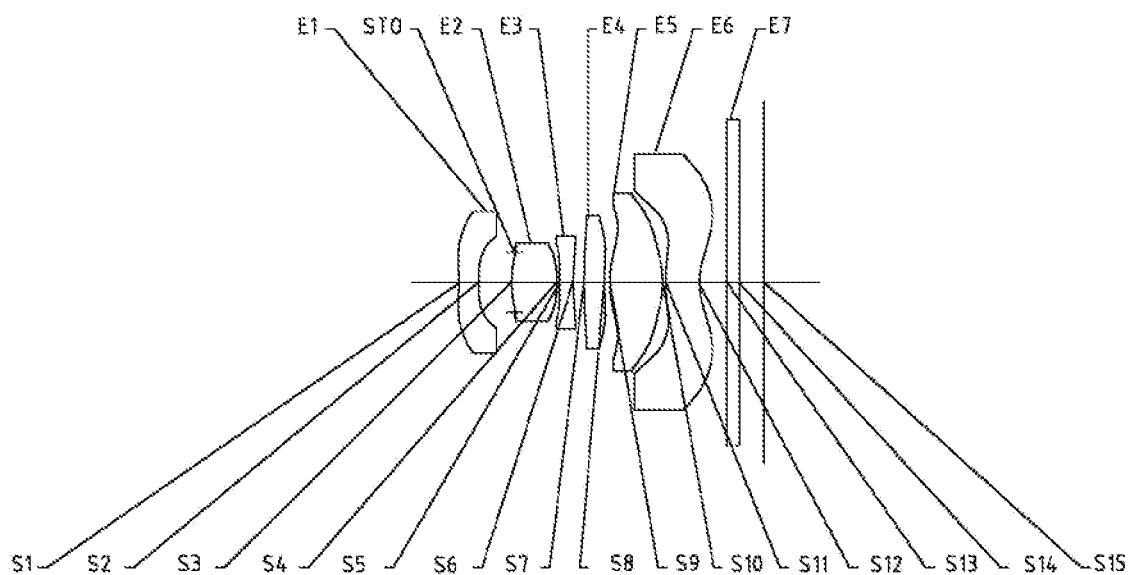
FIG. 9 illustrates a schematic structural view of a camera lens assembly according to example 5 of the present disclosure.

As shown in FIG. 9, the camera lens assembly according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 13 shows the surface type, the radius of curvature X, the radius of curvature Y, the thickness, the material, the conic coefficient X and the conic coefficient Y of each lens of the camera lens assembly in example 4, wherein the units for the radius of curvature X, the radius of curvature Y and the thickness are millimeter (mm). Table 14 shows high-order coefficients applicable to each aspheric surface in example 4, wherein the surface shape of each aspheric surface may be defined by the formula (1) given in the above example 1. Table 15 shows high-order coefficients applicable to the rotationally symmetrical component and the non-rotationally symmetrical component of the non-rotationally symmetrical aspheric surface S9 in example 4, wherein the surface shape of the non-rotationally symmetrical aspheric surface may be defined by the formula (2) given in the above example 1. Table 16 shows effective focal lengths f1 to f6 of respective lens, an effective focal length fx in an X-axis direction of the camera lens assembly, an effective focal length fy in a Y-axis direction of the camera lens assembly, a total optical length TTL of the camera lens assembly, half of a diagonal length ImgH of an effective pixel area on the imaging plane S15, and half of a maximal field-of-view HFOV in example 4.

TABLE 13

| Surface number | Surface type | Radius of curvature Y | Radius of curvature X | Thickness | Material Refractive index | Abbe number | Conic coefficient Y | Conic coefficient X |
|---|---|---|---|---|---|---|---|---|
| OBJ | Spherical | Infinite | | Infinite | | | | |
| S1 | Aspheric | −26.9775 | | 0.3533 | 1.54 | 55.7 | 70.9794 | |
| S2 | Aspheric | 1.9994 | | 0.6154 | | | −2.1643 | |
| STO | Spherical | Infinite | | −0.0500 | | | | |
| S3 | Aspheric | 2.0063 | | 0.7235 | 1.55 | 56.1 | −1.3941 | |
| S4 | Aspheric | −1.8941 | | 0.0500 | | | 4.6046 | |
| S5 | Aspheric | −11.9117 | | 0.2200 | 1.65 | 20.4 | 95.0000 | |
| S6 | Aspheric | 3.9313 | | 0.1646 | | | −15.9851 | |
| S7 | Aspheric | 9.9178 | | 0.3076 | 1.55 | 56.1 | −64.8695 | |
| S8 | Aspheric | 3.6705 | | 0.0804 | | | −72.1547 | |
| S9 (AAS surface) | Aspheric | 2.3003 | 2.3325 | 0.8562 | 1.55 | 56.1 | −26.8117 | −24.3717 |
| S10 | Aspheric | −1.2704 | | 0.0449 | | | −0.5395 | |
| S11 | Aspheric | 2.5483 | | 0.6380 | 1.65 | 20.4 | −0.9067 | |
| S12 | Aspheric | 1.0339 | | 0.4761 | | | −2.5598 | |
| S13 | Spherical | Infinite | | 0.2100 | 1.52 | 64.2 | | |
| S14 | Spherical | Infinite | | 0.4201 | | | | |
| S15 | Spherical | Infinite | | | | | | |

TABLE 14

| Surface number | A4 | A6 | A8 | A10 | A12 |
|---|---|---|---|---|---|
| S1 | 3.7269E−01 | −4.1708E−01 | 5.1966E−01 | −4.8110E−01 | 3.0387E−01 |
| S2 | 6.9648E−01 | −1.1003E+00 | 6.1048E+00 | −2.1696E+01 | 5.0318E+01 |
| S3 | 4.5656E−02 | −1.9353E−01 | 7.1694E−01 | −6.2249E+00 | 1.4448E+01 |
| S4 | −3.75E−01 | 2.22E+00 | −1.26E+01 | 5.70E+01 | −2.04E+02 |
| S5 | −5.5980E−01 | 2.0738E+00 | −9.5973E+00 | 3.7510E+01 | −1.2018E+02 |
| S6 | −2.2296E−01 | 6.7624E−01 | −2.4555E+00 | 1.0086E+01 | −3.4129E+01 |
| S7 | −1.0074E−01 | 1.3459E−01 | 2.3539E−01 | −1.2232E+00 | 1.9900E+00 |
| S8 | 1.02E−02 | −1.13E+00 | 3.01E+00 | −4.77E+00 | 4.76E+00 |
| S10 | 4.2946E−01 | −4.0067E−01 | 4.1989E−01 | −6.8636E−01 | 7.6768E−01 |
| S11 | 5.5255E−03 | −4.0549E−01 | 4.8396E−01 | −5.4100E−01 | 5.3751E−01 |
| S12 | −2.2673E−01 | 1.3364E−01 | −8.0634E−02 | 4.2445E−02 | −1.6576E−02 |

| Surface number | A14 | A16 | A18 | A20 |
|---|---|---|---|---|
| S1 | −1.2178E−01 | 2.1788E−02 | 0.0000E+00 | 0.0000E+00 |
| S2 | −6.2236E+01 | 2.9412E+01 | 0.0000E+00 | 0.0000E+00 |
| S3 | 7.9257E+00 | −1.3749E+02 | 3.0211E+02 | −2.4095E+02 |
| S4 | 5.10E+02 | −8.14E+02 | 7.39E+02 | −2.89E+02 |
| S5 | 2.7709E+02 | −4.1367E+02 | 3.5744E+02 | −1.3553E+02 |
| S6 | 7.8098E+01 | −1.0999E+02 | 8.6409E+01 | −2.8849E+01 |
| S7 | −1.5412E+00 | 4.0599E−01 | 1.2593E−01 | −6.6469E−02 |
| S8 | −2.65E+00 | 6.33E−01 | 2.01E−02 | −2.52E−02 |
| S10 | −4.9518E−01 | 1.8390E−01 | −3.6720E−02 | 3.0464E−03 |
| S11 | −3.7258E−01 | 1.5605E−01 | −3.4804E−02 | 3.1499E−03 |
| S12 | 4.3853E−03 | −7.3752E−04 | 7.0979E−05 | −2.9638E−06 |

TABLE 15

| AAS surface | AR | BR | CR | DR | AP | BP | CP | DP |
|---|---|---|---|---|---|---|---|---|
| S9 | 1.8478E−01 | −4.3361E−01 | 2.4818E−01 | −4.7002E−02 | 1.2351E−02 | 3.5735E−03 | 1.9619E−03 | 1.0519E−03 |

TABLE 16

| f1 (mm) | −3.45 | fx (mm) | 1.89 |
|---|---|---|---|
| f2 (mm) | 1.91 | fy (mm) | 1.88 |
| f3 (mm) | −4.41 | TTL (mm) | 5.14 |
| f4 (mm) | −10.86 | ImgH (mm) | 3.03 |
| f5 (mm) | 1.64 | HFOV (°) | 60.3 |
| f6 (mm) | −3.14 | | |

Figure 8:
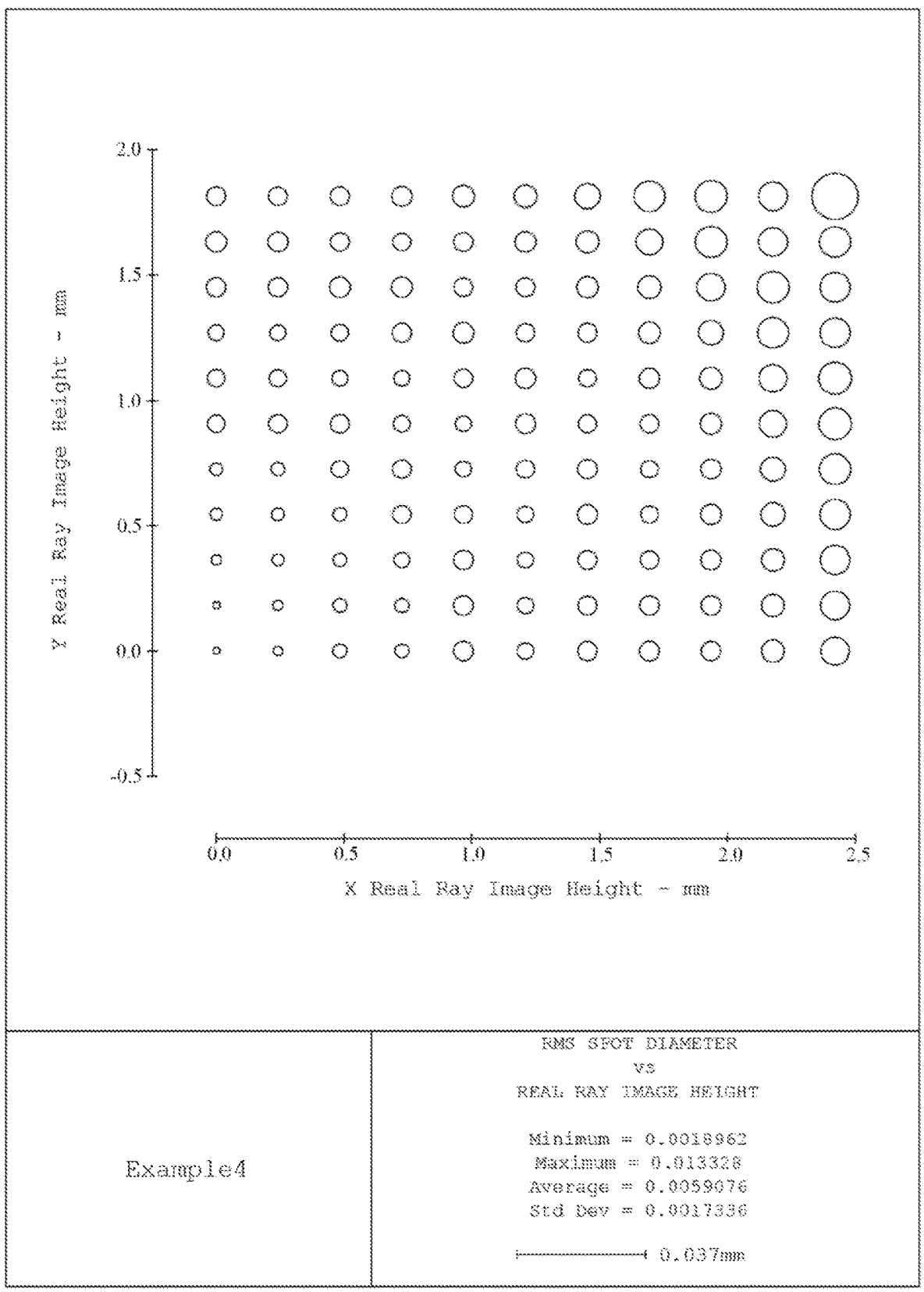
FIG. 8 schematically shows RMS spot diameter of the camera lens assembly of the example 4 in a first quadrant.

FIG. 8 illustrates a size distribution of an RMS spot diameter of the camera lens assembly according to example 4 at positions with different image heights in a first quadrant. It can be seen from FIG. 8 that the camera lens assembly provided in example 4 may achieve good image quality.

Example 5

A camera lens assembly according to example 5 of the present disclosure is described below with reference to FIG. 9 and FIG. 10. FIG. 9 shows a schematic structural view of the camera lens assembly according to example 5 of the present disclosure.

As shown in FIG. 9, the camera lens assembly according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 17 shows the surface type, the radius of curvature X, the radius of curvature Y, the thickness, material, the conic coefficient X and the conic coefficient Y of each lens of the camera lens assembly in example 5, wherein the units for the radius of curvature X, the radius of curvature Y and the thickness are millimeter (mm). Table 18 shows high-order coefficients applicable to each aspheric surface in example 5, wherein the surface shape of each aspheric surface may be defined by the formula (1) given in the above example 1. Table 19 shows high-order coefficients applicable to the rotationally symmetrical component and the non-rotationally symmetrical component of the non-rotationally symmetrical aspheric surface S10 in example 5, wherein the surface shape of the non-rotationally symmetrical aspheric surface may be defined by the formula (2) given in the above example 1. Table 20 shows effective focal lengths f1 to f6 of respective lens, an effective focal length fx in an X-axis direction of the camera lens assembly, an effective focal length fy in a Y-axis direction of the camera lens assembly, a total optical length TTL of the camera lens assembly, half of a diagonal length ImgH of an effective pixel area on the imaging plane S15, and half of a maximal field-of-view HFOV in example 5.

TABLE 17

| Surface number | Surface type | Radius of curvature Y | Radius of curvature X | Thickness | Material Refractive index | Material Abbe number | Conic coefficient Y | Conic coefficient X |
|---|---|---|---|---|---|---|---|---|
| OBJ | Spherical | Infinite | | Infinite | | | | |
| S1 | Aspheric | −3.1381 | | 0.3274 | 1.54 | 55.7 | −95.0000 | |
| S2 | Aspheric | 6.1758 | | 0.5993 | | | 13.6692 | |
| STO | Spherical | Infinite | | −0.0500 | | | | |
| S3 | Aspheric | 2.1559 | | 0.7573 | 1.55 | 56.1 | 0.1876 | |
| S4 | Aspheric | −2.0590 | | 0.0500 | | | 3.8683 | |
| S5 | Aspheric | −117.4886 | | 0.2200 | 1.65 | 20.4 | 95.0000 | |
| S6 | Aspheric | 3.2841 | | 0.1813 | | | −16.8461 | |
| S7 | Aspheric | 7.4258 | | 0.3375 | 1.55 | 56.1 | −17.7448 | |
| S8 | Aspheric | 3.8802 | | 0.0974 | | | −56.6585 | |
| S9 | Aspheric | 2.0124 | | 0.8838 | 1.55 | 56.1 | −9.1769 | |
| S10 (AAS surface) | Aspheric | −1.2967 | −1.3082 | 0.0449 | | | −0.7496 | −0.6862 |

TABLE 17-continued

| Surface number | Surface type | Radius of curvature Y | Radius of curvature X | Thickness | Material Refractive index | Material Abbe number | Conic coefficient Y | Conic coefficient X |
|---|---|---|---|---|---|---|---|---|
| S11 | Aspheric | 3.0140 | | 0.5593 | 1.65 | 20.4 | −0.8259 | |
| S12 | Aspheric | 1.0517 | | 0.4637 | | | −2.9033 | |
| S13 | Spherical | Infinite | | 0.2100 | 1.52 | 64.2 | | |
| S14 | Spherical | Infinite | | 0.4077 | | | | |
| S15 | Spherical | Infinite | | | | | | |

TABLE 18

| Surface number | A4 | A6 | A8 | A10 | A12 |
|---|---|---|---|---|---|
| S1 | 3.6917E−01 | −4.1662E−01 | 5.2075E−01 | −4.8061E−01 | 3.0411E−01 |
| S2 | 1.0764E+00 | −3.3247E+00 | 1.4473E+01 | −4.1091E+01 | 7.4640E+01 |
| S3 | 5.97E−02 | −1.58E−01 | 7.42E−01 | −5.81E+00 | 1.44E+01 |
| S4 | −3.60E−01 | 2.24E+00 | −1.26E+01 | 5.68E+01 | −2.04E+02 |
| S5 | −5.6459E−01 | 2.0651E+00 | −9.6098E+00 | 3.7374E+01 | −1.2018E+02 |
| S6 | −2.2764E−01 | 6.6204E−01 | −2.4817E+00 | 1.0081E+01 | −3.4129E+01 |
| S7 | −9.1233E−02 | 1.4038E−01 | 2.3939E−01 | −1.2233E+00 | 1.9854E+00 |
| S8 | 1.72E−02 | −1.12E+00 | 3.00E+00 | −4.77E+00 | 4.76E+00 |
| S9 | 1.9626E−01 | −7.3201E−01 | 1.2511E+00 | −1.5293E+00 | 1.0820E+00 |
| S11 | −6.5667E−02 | −2.7029E−01 | 2.2570E−01 | −2.4439E−01 | 3.5195E−01 |
| S12 | −2.2695E−01 | 1.3378E−01 | −8.0634E−02 | 4.2441E−02 | −1.6577E−02 |

| Surface number | A14 | A16 | A18 | A20 |
|---|---|---|---|---|
| S1 | −1.2184E−01 | 2.1695E−02 | 0.0000E+00 | 0.0000E+00 |
| S2 | −7.4959E+01 | 3.0436E+01 | 0.0000E+00 | 0.0000E+00 |
| S3 | 7.93E+00 | −1.37E+02 | 3.02E+02 | −2.41E+02 |
| S4 | 5.10E+02 | −8.14E+02 | 7.39E+02 | −2.89E+02 |
| S5 | 2.7709E+02 | −4.1367E+02 | 3.5744E+02 | −1.3553E+02 |
| S6 | 7.8098E+01 | −1.0999E+02 | 8.6409E+01 | −2.8849E+01 |
| S7 | −1.5405E+00 | 4.0599E−01 | 1.2593E−01 | −6.6469E−02 |
| S8 | −2.65E+00 | 6.33E−01 | 2.06E−02 | −2.52E−02 |
| S9 | −3.4836E−01 | −2.6627E−03 | 2.9498E−02 | −5.2647E−03 |
| S11 | −2.9930E−01 | 1.3433E−01 | −3.0166E−02 | 2.6776E−03 |
| S12 | 4.3852E−03 | −7.3750E−04 | 7.0988E−05 | −2.9607E−06 |

TABLE 19

| AAS surface | AR | BR | CR | DR | AP | BP | CP | DP |
|---|---|---|---|---|---|---|---|---|
| S10 | 4.5123E−01 | −3.9840E−01 | 1.4940E−01 | −1.9945E−02 | 1.2049E−03 | 2.5884E−03 | 2.2162E−03 | 2.5535E−03 |

TABLE 20

| | | | |
|---|---|---|---|
| f1 (mm) | −3.83 | fx (mm) | 1.89 |
| f2 (mm) | 2.06 | fy (mm) | 1.88 |
| f3 (mm) | −4.79 | TTL (mm) | 5.14 |
| f4 (mm) | −15.40 | ImgH (mm) | 3.03 |
| f5 (mm) | 1.59 | HFOV (°) | 60.3 |
| f6 (mm) | −2.74 | | |

Figure 10:
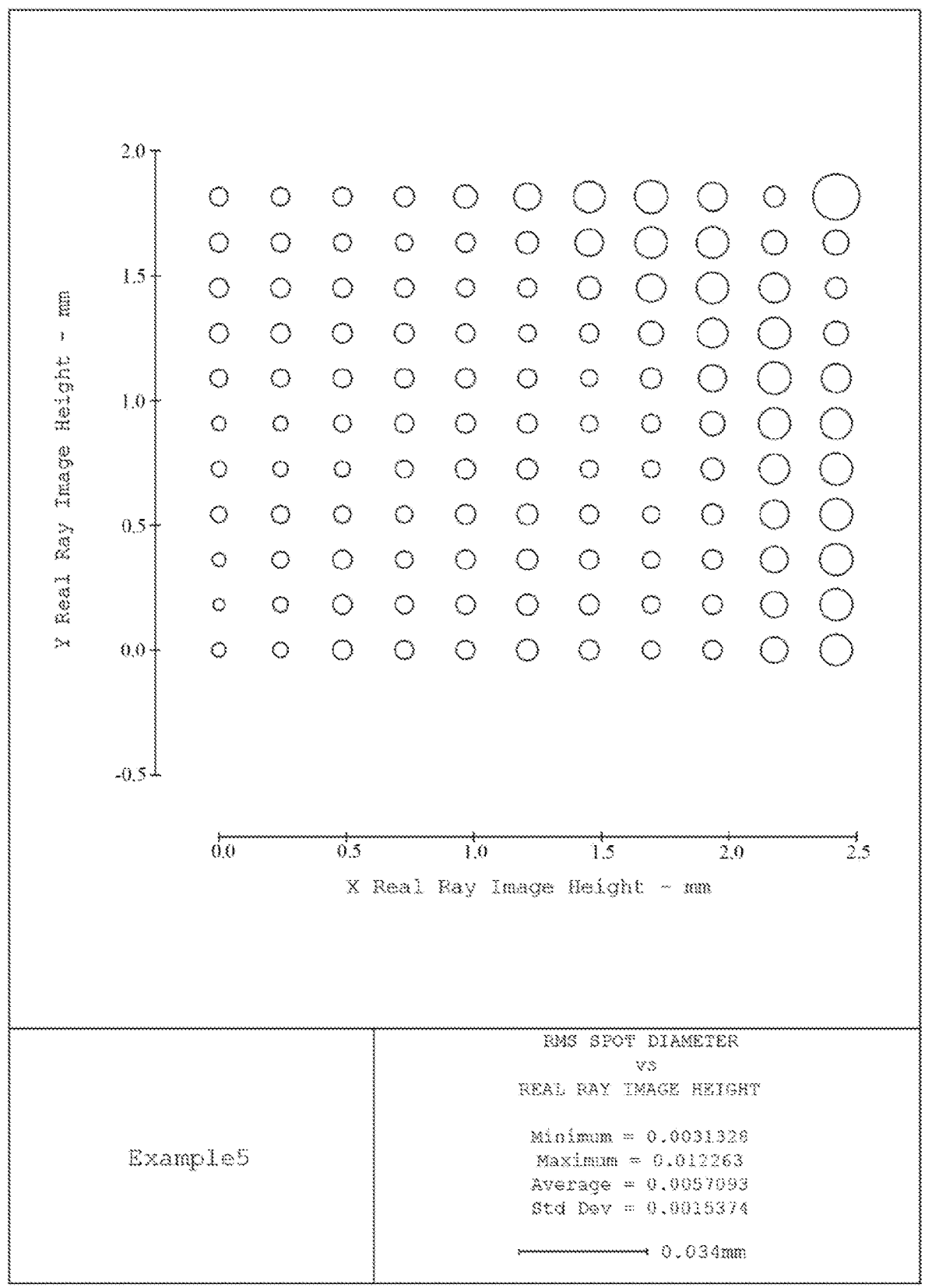
FIG. 10 schematically shows RMS spot diameter of the camera lens assembly of the example 5 in a first quadrant.

FIG. 10 illustrates a size distribution of an RMS spot diameter of the camera lens assembly according to example 5 at positions with different image heights in a first quadrant. It can be seen from FIG. 10 that the camera lens assembly provided in example 5 may achieve good image quality.

Example 6

Figure 11:
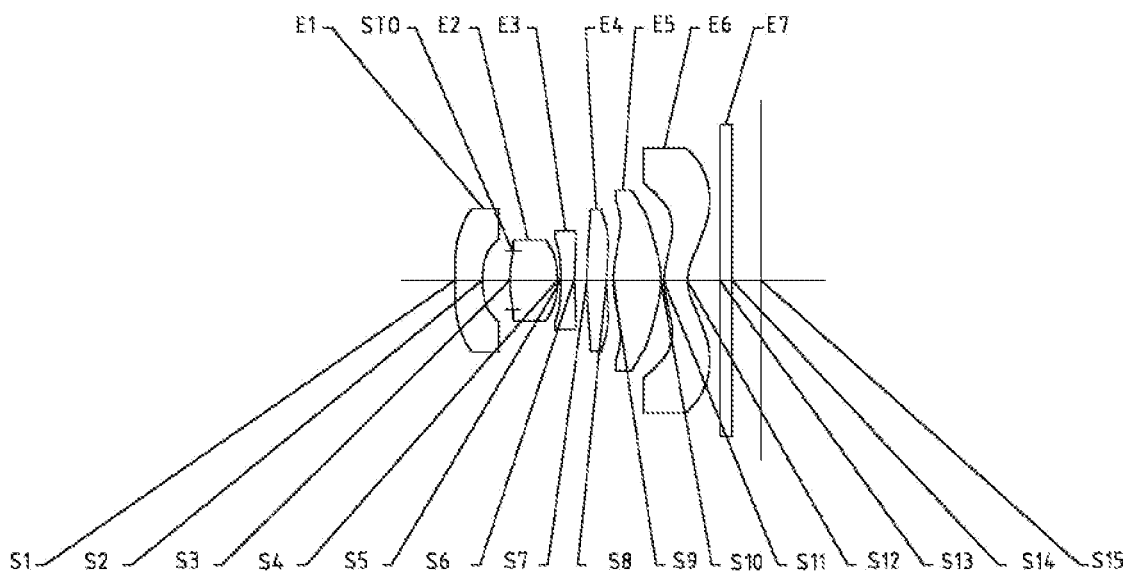
FIG. 11 illustrates a schematic structural view of a camera lens assembly according to example 6 of the present disclosure.

A camera lens assembly according to example 6 of the present disclosure is described below with reference to FIG. 11 and FIG. 12. FIG. 11 shows a schematic structural view of the camera lens assembly according to example 6 of the present disclosure.

As shown in FIG. 11, the camera lens assembly according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 21 shows the surface type, the radius of curvature X, the radius of curvature Y, the thickness, the material, the conic coefficient X and the conic coefficient Y of each lens of the camera lens assembly in example 6, wherein the units for the radius of curvature X, the radius of curvature Y and the thickness are millimeter (mm). Table 22 shows high-order coefficients applicable to each aspheric surface in example 6, wherein the surface shape of each aspheric surface may be defined by the formula (1) given in the above example 1. Table 23 shows high-order coefficients applicable to the rotationally symmetrical component and the non-rotationally symmetrical component of the non-rotationally symmetrical aspheric surface S11 in example 6, wherein the surface shape of the non-rotationally symmetrical aspheric surface may be defined by the formula (2) given in the above example 1. Table 24 shows effective focal lengths f1 to f6 of respective lens, an effective focal length fx in an X-axis direction of the camera lens assembly, an effective focal length fy in a Y-axis direction of the camera lens assembly, a total optical length TTL of the camera lens assembly, half of a diagonal length ImgH of an effective pixel area on the imaging plane S15, and half of a maximal field-of-view HFOV in example 6.

TABLE 21

| Surface number | Surface type | Radius of curvature Y | Radius of curvature X | Thickness | Material Refractive index | Abbe number | Conic coefficient Y | Conic coefficient X |
|---|---|---|---|---|---|---|---|---|
| OBJ | Spherical | Infinite | | Infinite | | | | |
| S1 | Aspheric | −154.6205 | | 0.4548 | 1.54 | 55.7 | −95.0000 | |
| S2 | Aspheric | 1.8478 | | 0.5126 | | | 3.5793 | |
| STO | Spherical | Infinite | | −0.0547 | | | | |
| S3 | Aspheric | 2.3122 | | 0.8015 | 1.55 | 56.1 | −2.7262 | |
| S4 | Aspheric | −1.7696 | | 0.0544 | | | 3.6123 | |
| S5 | Aspheric | −8.0954 | | 0.2200 | 1.65 | 20.4 | 56.6633 | |
| S6 | Aspheric | 5.3507 | | 0.2089 | | | −24.2710 | |
| S7 | Aspheric | 4.6475 | | 0.3294 | 1.55 | 56.1 | −18.2196 | |
| S8 | Aspheric | 2.8637 | | 0.1155 | | | −43.3861 | |
| S9 | Aspheric | 2.4232 | | 0.8003 | 1.55 | 56.1 | −5.8902 | |
| S10 | Aspheric | −1.2865 | | 0.0448 | | | −0.9493 | |
| S11 (AAS surface) | Aspheric | 1.1948 | 1.2045 | 0.3883 | 1.65 | 20.4 | −3.1684 | −2.7007 |
| S12 | Aspheric | 0.6698 | | 0.5427 | | | −3.1001 | |
| S13 | Spherical | Infinite | | 0.2100 | 1.52 | 64.2 | | |
| S14 | Spherical | Infinite | | 0.4814 | | | | |
| S15 | Spherical | Infinite | | | | | | |

TABLE 22

| Surface number | A4 | A6 | A8 | A10 | A12 |
|---|---|---|---|---|---|
| S1 | 2.7275E−01 | −2.5625E−01 | 2.6921E−01 | −2.1223E−01 | 1.1373E−01 |
| S2 | 4.8026E−01 | −2.2332E−01 | −5.7046E−01 | 6.4174E+00 | −1.8057E+01 |
| S3 | 5.25E−02 | −2.20E−01 | 7.01E−01 | −3.96E+00 | 5.42E+00 |
| S4 | −3.32E−01 | 1.27E+00 | −6.51E+00 | 2.55E+01 | −7.65E+01 |
| S5 | −4.7238E−01 | 1.3298E+00 | −5.2341E+00 | 1.6882E+01 | −4.5070E+01 |
| S6 | −1.7787E−01 | 4.2997E−01 | −1.2990E+00 | 4.5217E+00 | −1.2799E+01 |
| S7 | −9.6571E−02 | 9.5814E−02 | 1.2838E−01 | −5.4277E−01 | 7.4396E−01 |
| S8 | 1.36E−02 | −7.30E−01 | 1.60E+00 | −2.14E+00 | 1.78E+00 |
| S9 | 1.3499E−01 | −4.7448E−01 | 6.7031E−01 | −6.8434E−01 | 4.0601E−01 |
| S10 | 3.4469E−01 | −2.5945E−01 | 2.2266E−01 | −3.0829E−01 | 2.8796E−01 |
| S12 | −1.76E−01 | 7.80E−02 | −1.50E−02 | −6.65E−03 | 5.76E−03 |

| Surface number | A14 | A16 | A18 | A20 |
|---|---|---|---|---|
| S1 | −3.8279E−02 | 5.7357E−03 | 0.0000E+00 | 0.0000E+00 |
| S2 | 2.5768E+01 | −1.7469E+01 | 0.0000E+00 | 0.0000E+00 |
| S3 | 2.49E+00 | −3.61E+01 | 6.64E+01 | −4.43E+01 |
| S4 | 1.60E+02 | −2.14E+02 | 1.62E+02 | −5.31E+01 |

TABLE 22-continued

| | | | | |
|---|---|---|---|---|
| S5 | 8.6944E+01 | −1.0860E+02 | 7.8510E+01 | −2.4907E+01 |
| S6 | 2.4505E+01 | −2.8876E+01 | 1.8980E+01 | −5.3017E+00 |
| S7 | −4.8360E−01 | 1.0658E−01 | 2.7660E−02 | −1.2215E−02 |
| S8 | −8.30E−01 | 1.66E−01 | 4.57E−03 | −4.62E−03 |
| S9 | −1.0932E−01 | −7.0010E−04 | 6.4791E−03 | −9.6707E−04 |
| S10 | −1.5531E−01 | 4.8293E−02 | −8.0610E−03 | 5.5985E−04 |
| S12 | −1.91E−03 | 3.46E−04 | −3.35E−05 | 1.36E−06 |

TABLE 23

| AAS surface | AR | BR | CR | DR | AP | BP | CP | DP |
|---|---|---|---|---|---|---|---|---|
| S11 | −2.4439E−01 | 5.9712E−02 | −1.4973E−02 | 2.4034E−03 | −2.1593E−02 | −2.7068E−02 | −1.2341E−02 | 2.4572E−03 |

TABLE 24

| | | | |
|---|---|---|---|
| f1 (mm) | −3.40 | fx (mm) | 1.94 |
| f2 (mm) | 1.97 | fy (mm) | 1.92 |
| f3 (mm) | −4.80 | TTL (mm) | 5.41 |
| f4 (mm) | −14.62 | ImgH (mm) | 3.03 |
| f5 (mm) | 1.67 | HFOV (°) | 60.3 |
| f6 (mm) | −3.25 | | |

Figure 12:
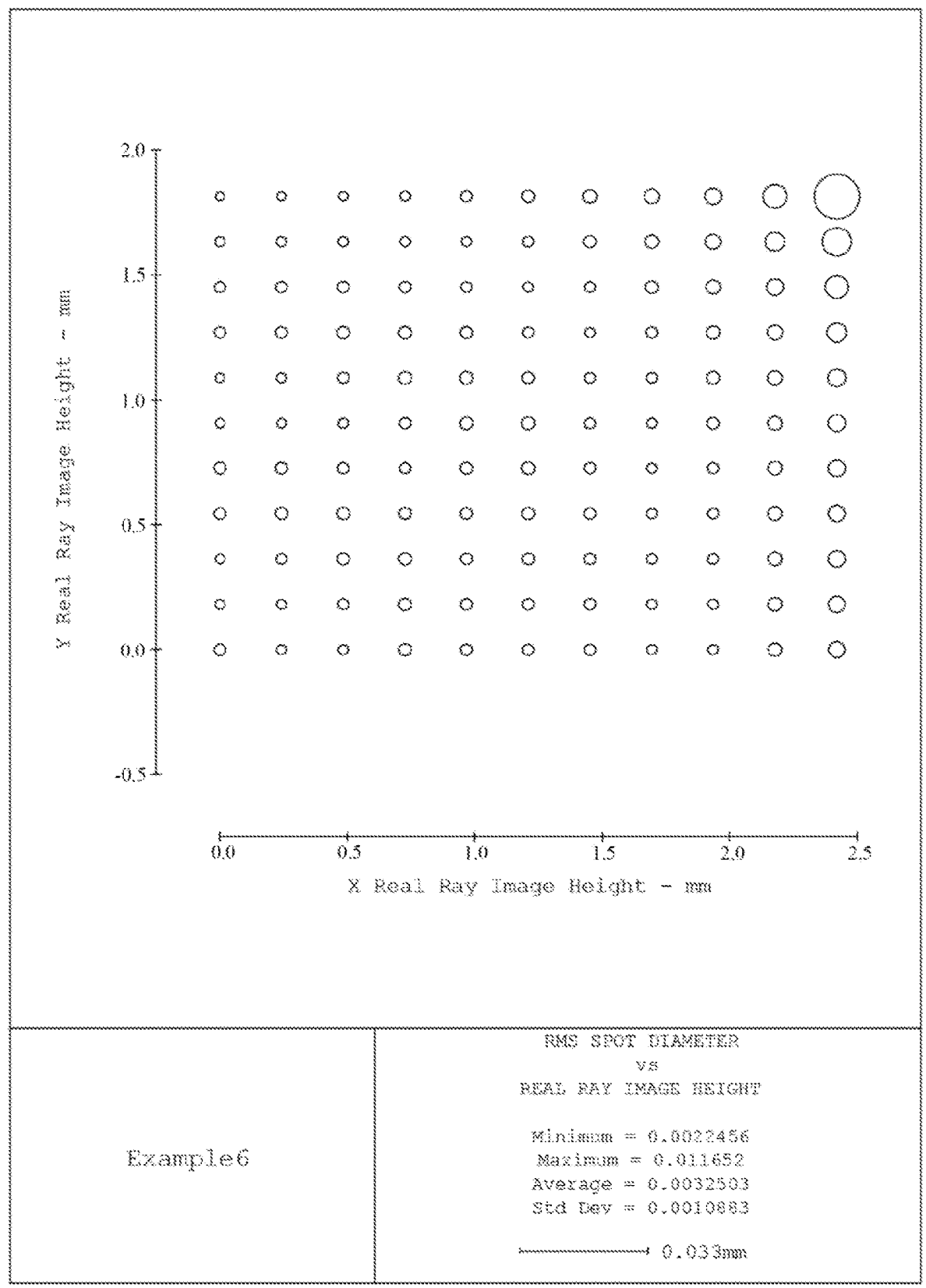
FIG. 12 schematically shows RMS spot diameter of the camera lens assembly of the example 6 in a first quadrant.

FIG. 12 illustrates a size distribution of an RMS spot diameter of the camera lens assembly according to example 6 at positions with different image heights in a first quadrant. It can be seen from FIG. 12 that the camera lens assembly provided in example 6 may achieve good image quality.

Example 7

Figure 13:
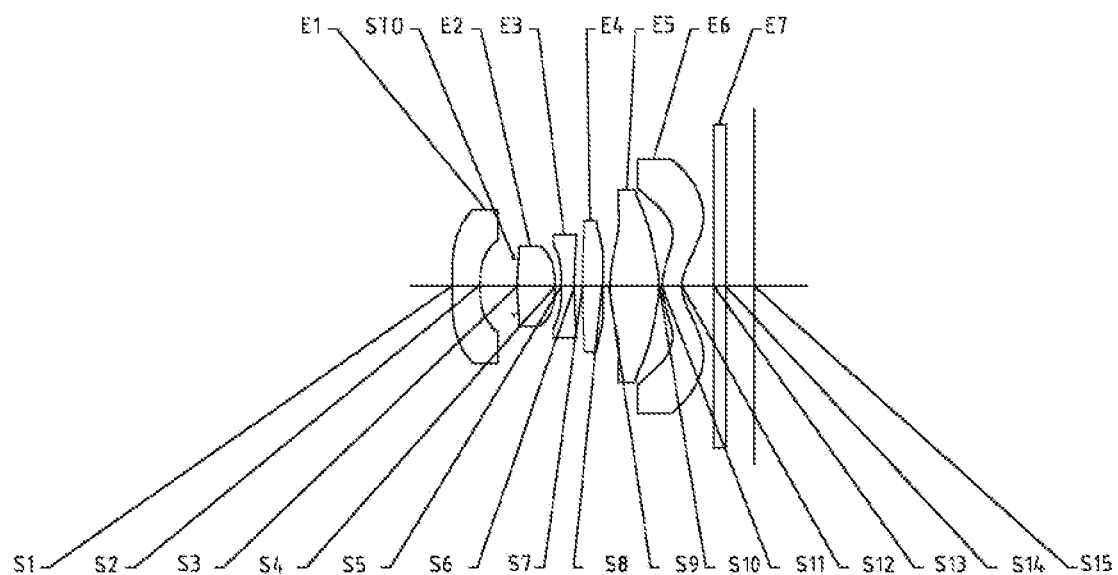
FIG. 13 illustrates a schematic structural view of a camera lens assembly according to example 7 of the present disclosure.

A camera lens assembly according to example 7 of the present disclosure is described below with reference to FIG. 13 and FIG. 14. FIG. 13 shows a schematic structural view of the camera lens assembly according to example 7 of the present disclosure.

As shown in FIG. 13, the camera lens assembly according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 25 shows the surface type, the radius of curvature X, the radius of curvature Y, the thickness, the material, the conic coefficient X and the conic coefficient Y of each lens of the camera lens assembly in example 7, wherein the units for the radius of curvature X, the radius of curvature Y and the thickness are millimeter (mm). Table 26 shows high-order coefficients applicable to each aspheric surface in example 7, wherein the surface shape of each aspheric surface may be defined by the formula (1) given in the above example 1. Table 27 shows high-order coefficients applicable to the rotationally symmetrical component and the non-rotationally symmetrical component of the non-rotationally symmetrical aspheric surface S12 in example 7, wherein the surface shape of the non-rotationally symmetrical aspheric surface may be defined by the formula (2) given in the above example 1. Table 28 shows effective focal lengths f1 to f6 of respective lens, an effective focal length fx in an X-axis direction of the camera lens assembly, an effective focal length fy in a Y-axis direction of the camera lens assembly, a total optical length TTL of the camera lens assembly, half of a diagonal length ImgH of an effective pixel area on the imaging plane S15, and half of a maximal field-of-view HFOV in example 7.

TABLE 25

| Surface number | Surface type | Radius of curvature Y | Radius of curvature X | Thickness | Material Refractive index | Material Abbe number | Conic coefficient Y | Conic coefficient X |
|---|---|---|---|---|---|---|---|---|
| OBJ | Spherical | Infinite | | Infinite | | | | |
| S1 | Aspheric | −16.9400 | | 0.4620 | 1.54 | 55.7 | −95.0000 | |
| S2 | Aspheric | 2.4339 | | 0.5805 | | | 6.9996 | |
| STO | Spherical | Infinite | | 0.0500 | | | | |
| S3 | Aspheric | 2.8989 | | 0.6526 | 1.55 | 56.1 | −22.7452 | |
| S4 | Aspheric | −1.5700 | | 0.0989 | | | 3.2166 | |

TABLE 25-continued

| Surface number | Surface type | Radius of curvature Y | Radius of curvature X | Thickness | Material Refractive index | Material Abbe number | Conic coefficient Y | Conic coefficient X |
|---|---|---|---|---|---|---|---|---|
| S5 | Aspheric | −5.0772 | | 0.2200 | 1.65 | 20.4 | 35.9997 | |
| S6 | Aspheric | 5.7788 | | 0.1398 | | | −14.1523 | |
| S7 | Aspheric | 13.2103 | | 0.3399 | 1.55 | 56.1 | −75.9828 | |
| S8 | Aspheric | 7.0165 | | 0.1236 | | | −95.0000 | |
| S9 | Aspheric | 2.5519 | | 0.8354 | 1.55 | 56.1 | −2.1913 | |
| S10 | Aspheric | −1.4039 | | 0.0448 | | | −0.4651 | |
| S11 | Aspheric | 0.9142 | | 0.3314 | 1.65 | 20.4 | −5.2843 | |
| S12 (AAS surface) | Aspheric | 0.5678 | 0.5665 | 0.5398 | | | −2.7529 | −2.7553 |
| S13 | Spherical | Infinite | | 0.2100 | 1.52 | 64.2 | | |
| S14 | Spherical | Infinite | | 0.4815 | | | | |
| S15 | Spherical | Infinite | | | | | | |

TABLE 26

| Surface number | A4 | A6 | A8 | A10 | A12 |
|---|---|---|---|---|---|
| S1 | 2.7066E−01 | −2.4224E−01 | 2.3018E−01 | −1.5024E−01 | 6.1609E−02 |
| S2 | 4.1080E−01 | −5.7630E−02 | −1.6514E+00 | 8.8154E+00 | −2.1173E+01 |
| S3 | −3.9269E−03 | 8.2628E−01 | −2.5878E+01 | 3.1857E+02 | −2.4775E+03 |
| S4 | −2.2683E−01 | −6.6392E−01 | 6.6695E+00 | −3.6372E+01 | 1.2408E+02 |
| S5 | −3.3774E−01 | 1.8181E−01 | −2.4925E+00 | 2.1758E+01 | −8.9482E+01 |
| S6 | −1.0118E−01 | 1.2460E−01 | −8.5446E−01 | 4.3409E+00 | −1.1355E+01 |
| S7 | −1.2754E−01 | 6.0585E−01 | −2.2133E+00 | 5.7286E+00 | −9.8783E+00 |
| S8 | −1.6978E−01 | −2.4679E−01 | 4.4070E−01 | 1.9723E−01 | −1.5513E+00 |
| S9 | 1.8914E−01 | −7.1893E−01 | 1.2424E+00 | −1.4858E+00 | 1.1443E+00 |
| S10 | 4.1533E−01 | −3.2792E−01 | 3.1703E−01 | −4.8074E−01 | 4.9661E−01 |
| S11 | 7.4039E−02 | −7.0743E−01 | 1.1675E+00 | −1.3187E+00 | 9.7666E−01 |

| Surface number | A14 | A16 | A18 | A20 |
|---|---|---|---|---|
| S1 | −1.2551E−02 | 4.2755E−04 | 0.0000E+00 | 0.0000E+00 |
| S2 | 2.7288E+01 | −1.5420E+01 | 0.0000E+00 | 0.0000E+00 |
| S3 | 1.1962E+04 | −3.5079E+04 | 5.6943E+04 | −3.9556E+04 |
| S4 | −2.7378E+02 | 3.6959E+02 | −2.7164E+02 | 7.6668E+01 |
| S5 | 2.1125E+02 | −2.9026E+02 | 2.1604E+02 | −6.6020E+01 |
| S6 | 1.7189E+01 | −1.5126E+01 | 7.1742E+00 | −1.3946E+00 |
| S7 | 1.1213E+01 | −8.0627E+00 | 3.3260E+00 | −6.0021E−01 |
| S8 | 2.5614E+00 | −2.0773E+00 | 8.4008E−01 | −1.3649E−01 |
| S9 | −5.3877E−01 | 1.4719E−01 | −2.0583E−02 | 1.0090E−03 |
| S10 | −2.9588E−01 | 1.0153E−01 | −1.8727E−02 | 1.4355E−03 |
| S11 | −4.4793E−01 | 1.2088E−01 | −1.7351E−02 | 1.0038E−03 |

TABLE 27

| AAS surface | AR | BR | CR | DR | AP | BP | CP | DP |
|---|---|---|---|---|---|---|---|---|
| S12 | −1.9070E−01 | 5.4126E−02 | −8.3663E−03 | 5.0522E−04 | 2.0437E−04 | −2.5015E−03 | −4.9508E−03 | −7.3218E−03 |

TABLE 28

| f1 (mm) | −3.93 | fx (mm) | 1.83 |
|---|---|---|---|
| f2 (mm) | 1.97 | fy (mm) | 1.82 |
| f3 (mm) | −4.02 | TTL (mm) | 5.16 |
| f4 (mm) | −27.95 | ImgH (mm) | 3.03 |
| f5 (mm) | 1.79 | HFOV (°) | 60.4 |
| f6 (mm) | −3.64 | | |

Figure 14:
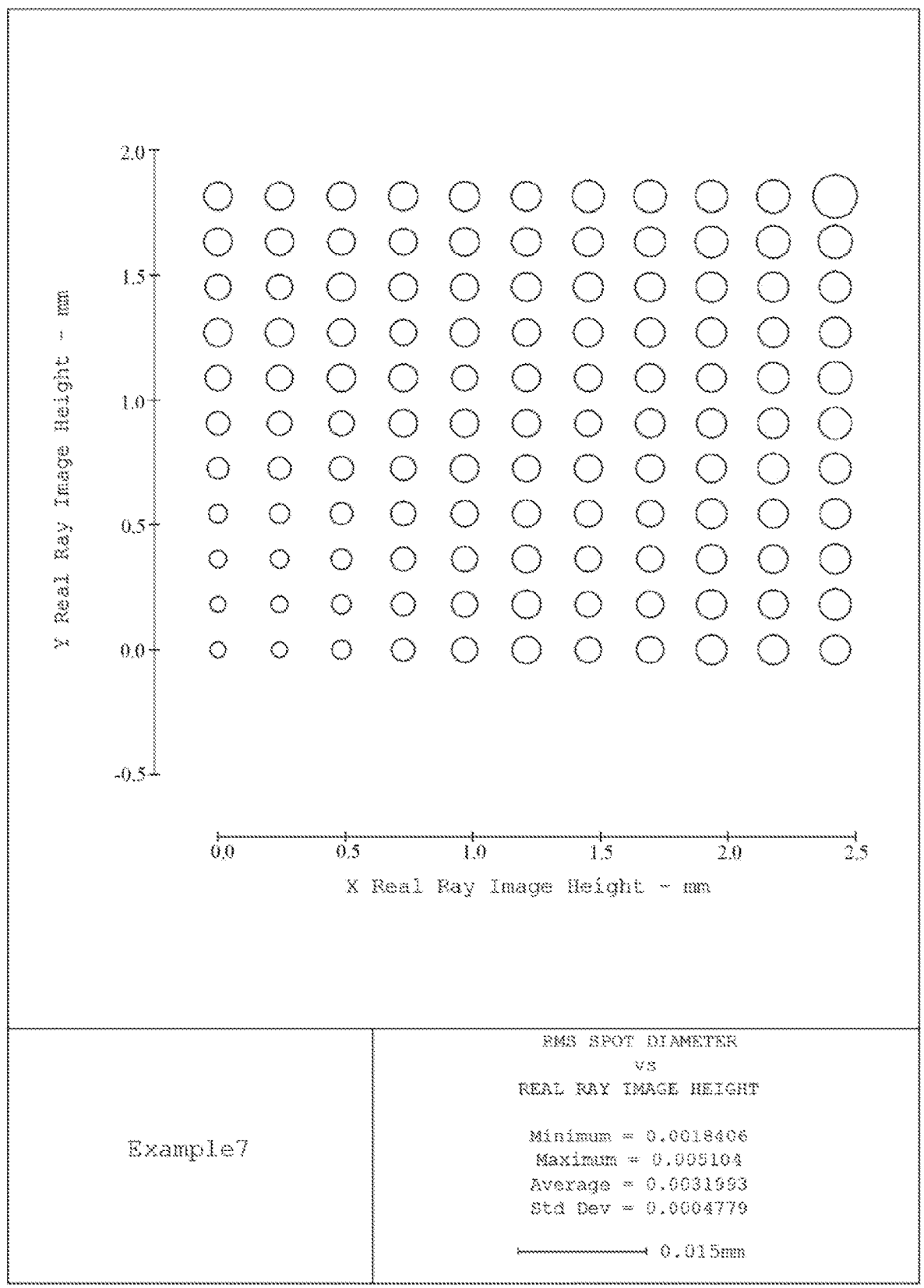
FIG. 14 schematically shows RMS spot diameter of the camera lens assembly of the example 7 in a first quadrant.

FIG. 14 illustrates a size distribution of an RMS spot diameter of the camera lens assembly according to example 7 at positions with different image heights in a first quadrant. It can be seen from FIG. 14 that the camera lens assembly provided in example 7 may achieve good image quality.

Example 8

Figure 15:
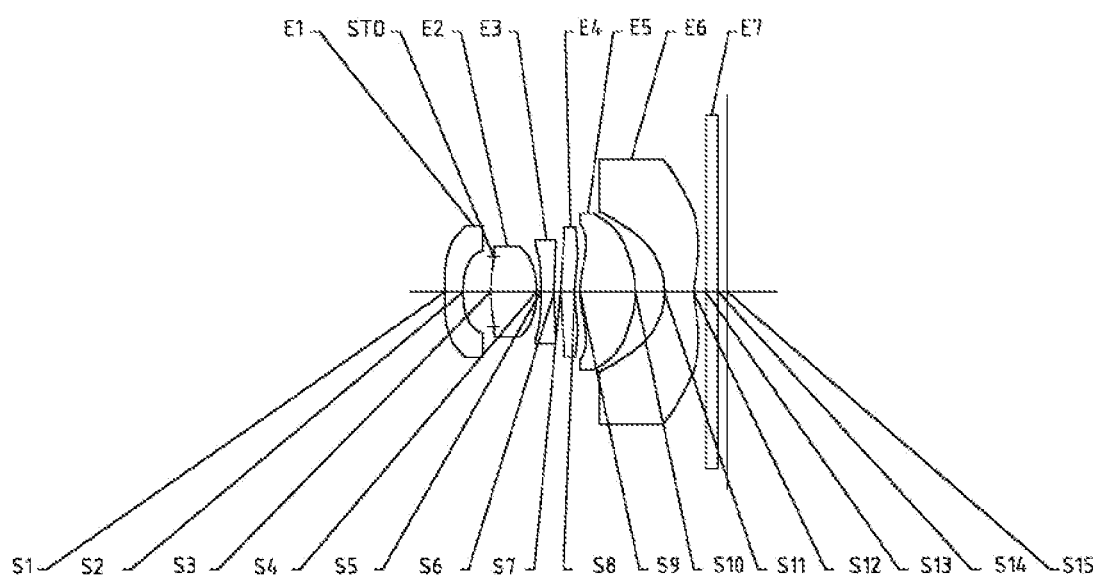
FIG. 15 illustrates a schematic structural view of a camera lens assembly according to example 8 of the present disclosure.

A camera lens assembly according to example 8 of the present disclosure is described below with reference to FIG. 15 and FIG. 16. FIG. 15 shows a schematic structural view of the camera lens assembly according to example 8 of the present disclosure.

As shown in FIG. 15, the camera lens assembly according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a concave surface, and an image-side surface S12 thereof is a concave surface. The optical filter E7 has an object-side surface S13 and an image-side surface S14.

Light from an object sequentially passes through the respective surfaces S1 to S14 and is finally imaged on the imaging plane S15.

Table 29 shows the surface type, the radius of curvature X, the radius of curvature Y, the thickness, the material, the conic coefficient X and the conic coefficient Y of each lens of the camera lens assembly in example 8, wherein the units for the radius of curvature X, the radius of curvature Y and the thickness are millimeter (mm). Table 30 shows high-order coefficients applicable to each aspheric surface in example 8, wherein the surface shape of each aspheric surface may be defined by the formula (1) given in the above example 1. Table 31 shows high-order coefficients applicable to the rotationally symmetrical component and the non-rotationally symmetrical component of the non-rotationally symmetrical aspheric surface S1 in example 8, wherein the surface shape of the non-rotationally symmetrical aspheric surface may be defined by the formula (2) given in the above example 1. Table 32 shows effective focal lengths f1 to f6 of respective lens, an effective focal length fx in an X-axis direction of the camera lens assembly, an effective focal length fy in a Y-axis direction of the camera lens assembly, a total optical length TTL of the camera lens assembly, half of a diagonal length ImgH of an effective pixel area on the imaging plane S15, and half of a maximal field-of-view HFOV in example 8.

TABLE 29

| Surface number | Surface type | Radius of curvature Y | Radius of curvature X | Thickness | Material Refractive index | Abbe number | Conic coefficient Y | Conic coefficient X |
|---|---|---|---|---|---|---|---|---|
| OBJ | Spherical | Infinite | | Infinite | | | | |
| S1 (AAS surface) | Aspheric | −20.888 | −155.8142 | 0.3149 | 1.54, | 55.7 | −95.0000 | 95.0000 |
| S2 | Aspheric | 2.672056 | | 0.5251 | | | 10.2522 | |
| STO | Spherical | Infinite | | −0.0510 | | | | |
| S3 | Aspheric | 2.544254 | | 0.7920 | 1.55, | 56.1 | −5.9004 | |
| S4 | Aspheric | −1.809 | | 0.0706 | | | 3.7823 | |
| S5 | Aspheric | −37.7776 | | 0.2300 | 1.65, | 20.4 | 0.0000 | |
| S6 | Aspheric | 5.79682 | | 0.1066 | | | −21.9777 | |
| S7 | Aspheric | 2.316642 | | 0.2435 | 1.55, | 56.1 | −93.0998 | |
| S8 | Aspheric | 1.649275 | | 0.0930 | | | −28.1814 | |
| S9 | Aspheric | 1.651385 | | 0.9530 | 1.55, | 56.1 | −11.5095 | |
| S10 | Aspheric | −1.49245 | | 0.4956 | | | −0.0132 | |
| S11 | Aspheric | −2.76108 | | 0.5039 | 1.65, | 20.4 | −29.7418 | |
| S12 | Aspheric | 0.500936 | | 0.2123 | | | −25.1422 | |
| S13 | Spherical | Infinite | | 0.2100 | 1.52, | 64.2 | | |
| S14 | Spherical | Infinite | | 0.1552 | | | | |
| S15 | Spherical | Infinite | | | | | | |

TABLE 30

| Surface number | A4 | A6 | A8 | A10 | A12 |
|---|---|---|---|---|---|
| S2 | 9.4879E−01 | −4.9852E+00 | 3.3811E+01 | −1.3318E+02 | 3.0747E+02 |
| S3 | −2.0485E−01 | 7.8302E+00 | −1.3142E+02 | 1.2603E+03 | −7.3979E+03 |
| S4 | 3.0090E−02 | −5.8006E+00 | 6.3038E+01 | −3.7970E+02 | 1.3962E+03 |
| S5 | −4.5210E−01 | 2.0750E+00 | −1.1342E+01 | 4.4210E+01 | −1.2400E+02 |
| S6 | −2.4953E−01 | 5.8506E−01 | 7.8958E+00 | −9.3078E+00 | 2.5718E+01 |
| S7 | 7.9761E−02 | −1.1352E+00 | 3.5033E+00 | −1.3381E+00 | −1.4767E+01 |
| S8 | 6.1325E−02 | −1.0781E+00 | 1.6138E+00 | 6.3128E−01 | −4.3113E+00 |
| S9 | 7.9671E−02 | −2.1546E−01 | −3.5538E−01 | 9.1280E−01 | −3.3313E−01 |
| S10 | 2.3336E−02 | 6.6835E−01 | −1.3151E+00 | 9.5653E−01 | −9.6497E−02 |
| S11 | −2.3603E+00 | 1.0038E+01 | −2.6440E+01 | 4.4211E+01 | −4.8283E+01 |
| S12 | −3.4432E−01 | 5.4629E−01 | −5.3916E−01 | 3.3067E−01 | −1.3071E−01 |

TABLE 30-continued

| Surface number | A14 | A16 | A18 | A20 |
|---|---|---|---|---|
| S2 | −3.7861E+02 | 1.9600E+02 | 0.0000E+00 | 0.0000E+00 |
| S3 | 2.6929E+04 | −5.9334E+04 | 7.2498E+04 | −3.7733E+04 |
| S4 | −3.1890E+03 | 4.4198E+03 | −3.4069E+03 | 1.1228E+03 |
| S5 | 2.4552E+02 | −3.1804E+02 | 2.3698E+02 | −7.6008E+01 |
| S6 | −3.5604E+01 | 2.6442E+01 | −9.5235E+00 | 1.1296E+00 |
| S7 | 3.7062E+01 | −4.0707E+01 | 2.2216E+01 | −4.9249E+00 |
| S8 | 4.6878E+00 | −1.7764E+00 | −8.4808E−02 | 1.4119E−01 |
| S9 | −9.8330E−01 | 1.2950E+00 | −6.0349E−01 | 9.9660E−02 |
| S10 | −3.0232E−01 | 2.0788E−01 | −5.7200E−02 | 5.9381E−03 |
| S11 | 3.4047E+01 | −1.4828E+01 | 3.6102E+00 | −3.7480E−01 |
| S12 | 3.3270E−02 | −5.2387E−03 | 4.6203E−04 | −1.7397E−05 |

TABLE 31

| AAS surface | AR | BR | CR | DR | AP | BP | CP | DP |
|---|---|---|---|---|---|---|---|---|
| S1 | 3.6282E−01 | −2.4664E−01 | 1.6923E−01 | −4.6418E−02 | 4.5730E−02 | 7.2397E−02 | 5.3409E−02 | 3.8719E−02 |

TABLE 32

| | | | |
|---|---|---|---|
| f1 (mm) | −4.39 | fx (mm) | 2.12 |
| f2 (mm) | 2.07 | fy (mm) | 2.37 |
| f3 (mm) | −7.53 | TTL (mm) | 4.90 |
| f4 (mm) | −12.04 | ImgH (mm) | 3.03 |
| f5 (mm) | 1.61 | HFOV (°) | 60.0 |
| f6 (mm) | −0.60 | | |

Figure 16:
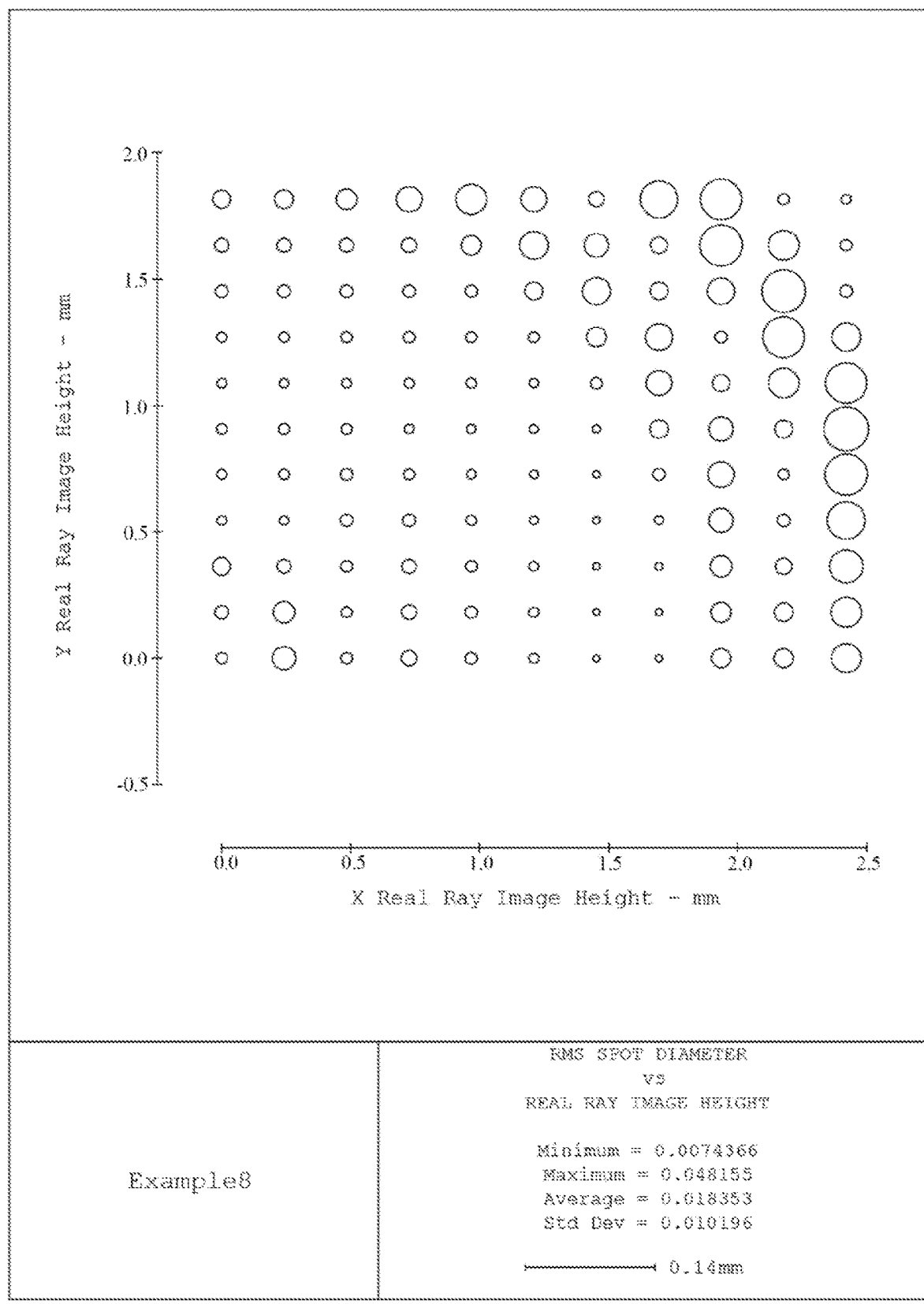
FIG. 16 schematically shows RMS spot diameter of the camera lens assembly of the example 8 in a first quadrant.

FIG. 16 illustrates a size distribution of an RMS spot diameter of the camera lens assembly according to example 8 at positions with different image heights in a first quadrant. It can be seen from FIG. 16 that the camera lens assembly provided in example 8 may achieve good image quality.

Example 9

Figure 17:
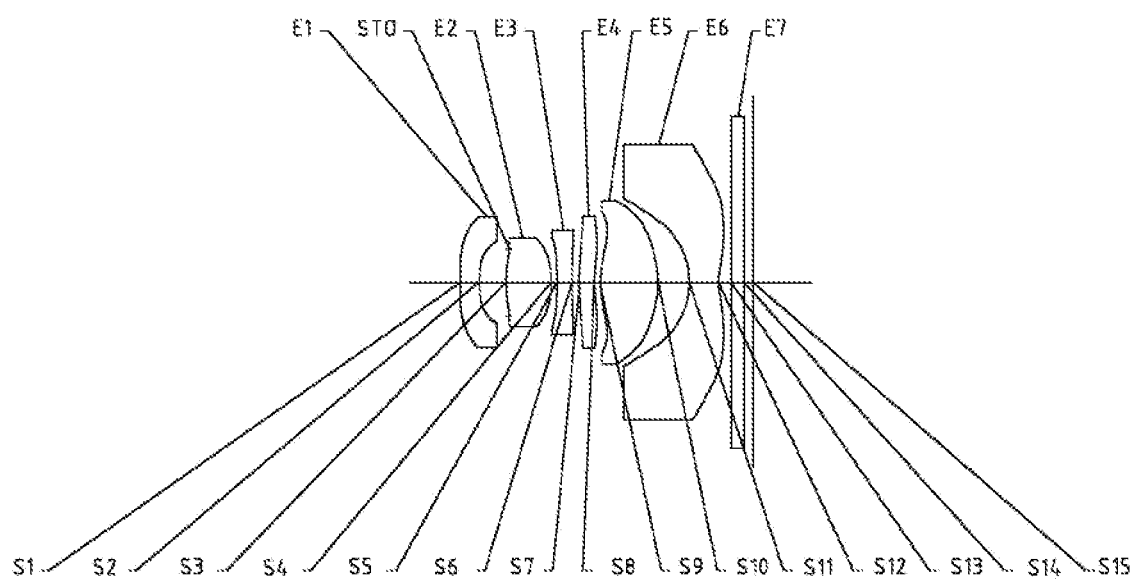
FIG. 17 illustrates a schematic structural view of a camera lens assembly according to example 9 of the present disclosure.

A camera lens assembly according to example 9 of the present disclosure is described below with reference to FIG. 17 and FIG. 18. FIG. 17 shows a schematic structural view of the camera lens assembly according to example 9 of the present disclosure.

As shown in FIG. 17, the camera lens assembly according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a concave surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 33 shows the surface type, the radius of curvature X, the radius of curvature Y, the thickness, the material, the conic coefficient X and the conic coefficient Y of each lens of the camera lens assembly in example 9, wherein the units for the radius of curvature X, the radius of curvature Y and the thickness are millimeter (mm). Table 34 shows high-order coefficients applicable to each aspheric surface in example 9, wherein the surface shape of each aspheric surface may be defined by the formula (1) given in the above example 1. Table 35 shows high-order coefficients applicable to the rotationally symmetrical component and the non-rotationally symmetrical component of the non-rotationally symmetrical aspheric surface S1 in example 9, wherein the surface shape of the non-rotationally symmetrical aspheric surface may be defined by the formula (2) given in the above example 1. Table 36 shows effective focal lengths f1 to f6 of respective lens, an effective focal length fx in an X-axis direction of the camera lens assembly, an effective focal length fy in a Y-axis direction of the camera lens assembly, a total optical length TTL of the camera lens assembly, half of a diagonal length ImgH of an effective pixel area on the imaging plane S15, and half of a maximal field-of-view HFOV in example 9.

TABLE 33

| Surface number | Surface type | Radius of curvature Y | Radius of curvature X | Thickness | Refractive index | Abbe number | Conic coefficient Y | Conic coefficient X |
|---|---|---|---|---|---|---|---|---|
| OBJ | Spherical | Infinite | | Infinite | | | | |
| S1 (AAS surface) | Aspheric | −89.6069 | −22.1116 | 0.3155 | 1.54 | 55.7 | 95.0000 | −95.0000 |
| S2 | Aspheric | 2.44849 | | 0.4948 | | | 10.4474 | |
| STO | Spherical | Infinite | | −0.0510 | | | | |
| S3 | Aspheric | 2.539181 | | 0.7548 | 1.55 | 56.1 | −4.8434 | |
| S4 | Aspheric | −1.80658 | | 0.0951 | | | 3.7807 | |
| S5 | Aspheric | −58.5624 | | 0.2472 | 1.65 | 20.4 | 0.0000 | |
| S6 | Aspheric | 5.620958 | | 0.1136 | | | −16.8463 | |
| S7 | Aspheric | 2.707066 | | 0.2619 | 1.55 | 56.1 | −94.5434 | |
| S8 | Aspheric | 2.004948 | | 0.0999 | | | −28.6685 | |
| S9 | Aspheric | 1.743579 | | 0.9607 | 1.55 | 56.1 | −10.4721 | |
| S10 | Aspheric | −1.56526 | | 0.5161 | | | 0.0502 | |
| S11 | Aspheric | −3.04261 | | 0.4863 | 1.65 | 20.4 | −31.4269 | |
| S12 | Aspheric | 0.540849 | | 0.2140 | | | −21.8888 | |
| S13 | Spherical | Infinite | | 0.2100 | 1.52 | 64.2 | | |
| S14 | Spherical | Infinite | | 0.1568 | | | | |
| S15 | Spherical | Infinite | | | | | | |

TABLE 34

| Surface number | A4 | A6 | A8 | A10 | A12 |
|---|---|---|---|---|---|
| S2 | 9.8003E−01 | −6.5933E+00 | 5.0620E+01 | −2.1909E+02 | 5.4123E+02 |
| S3 | −1.6807E−01 | 7.1327E+00 | −1.2484E+02 | 1.2505E+03 | −7.7269E+03 |
| S4 | −3.8977E−02 | −4.4648E+00 | 5.2515E+01 | −3.4558E+02 | 1.3984E+03 |
| S5 | −5.1007E−01 | 3.0525E+00 | −1.9584E+01 | 8.2570E+01 | −2.3010E+02 |
| S6 | −2.2858E−01 | 2.6859E−02 | 6.2811E+00 | −3.7351E+01 | 1.0996E+02 |
| S7 | 9.3589E−02 | −1.7181E+00 | 8.4157E+00 | −2.0305E+01 | 2.5891E+01 |
| S8 | 9.2269E−02 | −1.6149E+00 | 4.5299E+00 | −6.9180E+00 | 6.3628E+00 |
| S9 | 9.9198E−02 | −2.2146E−01 | −9.9766E−01 | 4.3534E+00 | −8.2379E+00 |
| S10 | 4.1056E−02 | 5.2717E−01 | −1.1383E+00 | 1.1098E+00 | −6.7881E−01 |
| S11 | −2.1396E+00 | 8.1176E+00 | −1.9303E+01 | 2.9785E+01 | −3.0691E+01 |
| S12 | −3.7931E−01 | 5.7375E−01 | −4.9881E−01 | 2.6790E−01 | −9.3912E−02 |

| Surface number | A14 | A16 | A18 | A20 |
|---|---|---|---|---|
| S2 | −7.0364E+02 | 3.7878E+02 | 0.0000E+00 | 0.0000E+00 |
| S3 | 2.9854E+04 | −7.0292E+04 | 9.2204E+04 | −5.1633E+04 |
| S4 | −3.5257E+03 | 5.3923E+03 | −4.5735E+03 | 1.6502E+03 |
| S5 | 4.2033E+02 | −4.8324E+02 | 3.1794E+02 | −9.1414E+01 |
| S6 | −1.9012E+02 | 1.9658E+02 | −1.1278E+02 | 2.7686E+01 |
| S7 | −1.4597E+01 | −1.9335E+00 | 6.3453E+00 | −2.2040E+00 |
| S8 | −3.9026E+00 | 2.0420E+00 | −9.0144E−01 | 1.9314E−01 |
| S9 | 8.7747E+00 | −5.4298E+00 | 1.8306E+00 | −2.6066E−01 |
| S10 | 2.9413E−01 | −8.8512E−02 | 1.5986E−02 | −1.2558E−03 |
| S11 | 2.0737E+01 | −8.7337E+00 | 2.0683E+00 | −2.0985E−01 |
| S12 | 2.1524E−02 | −3.0895E−03 | 2.5049E−04 | −8.7200E−06 |

TABLE 35

| AAS surface | AR | BR | CR | DR | AP | BP | CP | DP |
|---|---|---|---|---|---|---|---|---|
| S1 | 3.5097E−01 | −2.4458E−01 | 1.6889E−01 | −4.7168E−02 | −2.0028E−02 | −3.4925E−04 | 3.5476E−02 | 6.2928E−02 |

TABLE 36

| f1 (mm) | −4.44 | fx (mm) | 2.38 |
|---|---|---|---|
| f2 (mm) | 2.06 | fy (mm) | 2.18 |
| f3 (mm) | −7.68 | TTL (mm) | 4.93 |
| f4 (mm) | −16.31 | ImgH (mm) | 3.03 |
| f5 (mm) | 1.68 | HFOV (°) | 59.1 |
| f6 (mm) | −0.65 | | |

Figure 18:
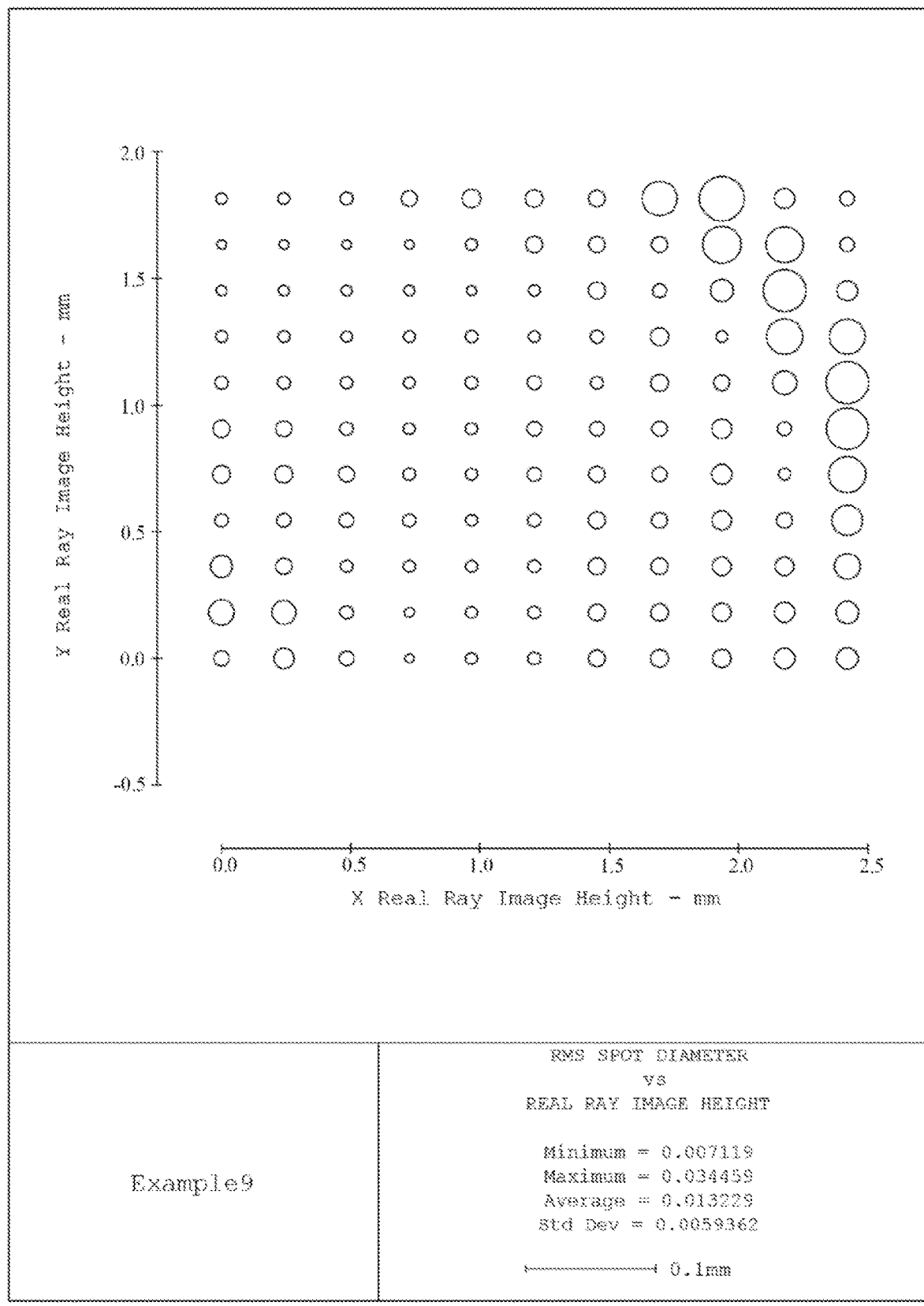
FIG. 18 schematically shows RMS spot diameter of the camera lens assembly of the example 9 in a first quadrant.

FIG. 18 illustrates a size distribution of an RMS spot diameter of the camera lens assembly according to example 9 at positions with different image heights in a first quadrant. It can be seen from FIG. 18 that the camera lens assembly provided in example 9 may achieve good image quality.

Example 10

Figure 19:
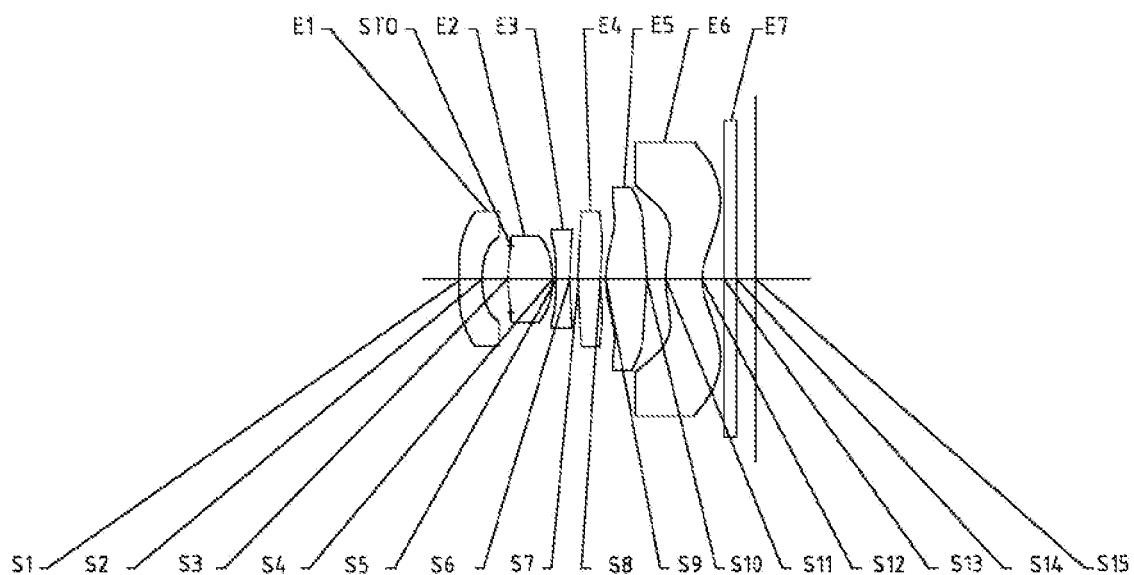
FIG. 19 illustrates a schematic structural view of a camera lens assembly according to example 10 of the present disclosure.

A camera lens assembly according to example 10 of the present disclosure is described below with reference to FIG. 19 and FIG. 20. FIG. 19 shows a schematic structural view of the camera lens assembly according to example 10 of the present disclosure.

As shown in FIG. 19, the camera lens assembly according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 37 shows the surface type, the radius of curvature X, the radius of curvature Y, the thickness, the material, the conic coefficient X and the conic coefficient Y of each lens of the camera lens assembly in example 10, wherein the units for the radius of curvature X, the radius of curvature Y and the thickness are millimeter (mm). Table 38 shows high-order coefficients applicable to each aspheric surface in example 10, wherein the surface shape of each aspheric surface may be defined by the formula (1) given in the above example 1. Table 39 shows high-order coefficients applicable to the rotationally symmetrical component and the non-rotationally symmetrical component of the non-rotationally symmetrical aspheric surface S2 in example 10, wherein the surface shape of the non-rotationally symmetrical aspheric surface may be defined by the formula (2) given in the above example 1. Table 40 shows effective focal lengths f1 to f6 of respective lens, an effective focal length fx in an X-axis direction of the camera lens assembly, an effective focal length fy in a Y-axis direction of the camera lens assembly, a total optical length TTL of the camera lens assembly, half of a diagonal length ImgH of an effective pixel area on the imaging plane S15, and half of a maximal field-of-view HFOV in example 10.

TABLE 37

| Surface number | Surface type | Radius of curvature Y | Radius of curvature X | Thickness | Material Refractive index | Abbe number | Conic coefficient Y | Conic coefficient X |
|---|---|---|---|---|---|---|---|---|
| OBJ | Spherical | Infinite | | Infinite | | | | |
| S1 | Aspheric | −157.685 | | 0.3822 | 1.54 | 55.7 | 95.0000 | |
| S2 (AAS surface) | Aspheric | 2.2862 | 2.5938 | 0.4765 | | | 2.5924 | 8.7584 |
| STO | Spherical | Infinite | | −0.0498 | | | | |
| S3 | Aspheric | 2.59267 | | 0.7467 | 1.55 | 56.1 | −2.0389 | |
| S4 | Aspheric | −1.76571 | | 0.0541 | | | 3.3613 | |
| S5 | Aspheric | −38.5223 | | 0.2300 | 1.65 | 20.4 | −95.0000 | |
| S6 | Aspheric | 3.972171 | | 0.1323 | | | −17.4185 | |
| S7 | Aspheric | 3.583372 | | 0.3748 | 1.55 | 56.1 | −94.2042 | |
| S8 | Aspheric | 2.197167 | | 0.0946 | | | −42.6897 | |
| S9 | Aspheric | 2.071686 | | 0.6828 | 1.55 | 56.1 | −5.4997 | |
| S10 | Aspheric | −2.19484 | | 0.3143 | | | −0.4068 | |
| S11 | Aspheric | 2.052799 | | 0.6030 | 1.65 | 20.4 | −1.6880 | |
| S12 | Aspheric | 0.948213 | | 0.3711 | | | −2.3986 | |
| S13 | Spherical | Infinite | | 0.2100 | 1.52 | 64.2 | | |
| S14 | Spherical | Infinite | | 0.3140 | | | | |
| S15 | Spherical | Infinite | | | | | | |

TABLE 38

| Surface number | A4 | A6 | A8 | A10 | A12 |
|---|---|---|---|---|---|
| S1 | 3.5300E−01 | −4.1118E−01 | 5.7136E−01 | −5.6748E−01 | 3.6241E−01 |
| S3 | 2.5513E−02 | 6.4224E−01 | −8.9674E+00 | 6.5925E+01 | −3.5725E+02 |
| S4 | −3.5391E−01 | 1.4960E+00 | −5.1846E+00 | 1.5238E+01 | −4.8518E+01 |
| S5 | −5.0118E−01 | 1.7795E+00 | −6.5905E+00 | 2.0561E+01 | −5.2786E+01 |
| S6 | −1.7691E−01 | 1.6224E−01 | 4.0138E−01 | 1.6547E−01 | −1.0459E+01 |
| S7 | −7.9403E−02 | 1.1137E−01 | 1.4397E−01 | −2.7804E−01 | −9.7346E−01 |
| S8 | 3.3802E−02 | −1.0702E+00 | 2.8843E+00 | −4.6343E+00 | 4.7024E+00 |
| S9 | 1.7958E−01 | −6.3266E−01 | 1.0313E+00 | −1.2263E+00 | 8.3851E−01 |
| S10 | 3.7950E−01 | −1.8883E−01 | −1.7654E−01 | 3.0895E−01 | −2.5512E−01 |
| S11 | −1.1782E−01 | −2.0894E−01 | 2.2655E−01 | −1.7390E−01 | 9.5022E−02 |
| S12 | −2.1617E−01 | 1.2684E−01 | −6.2974E−02 | 2.0538E−02 | −2.7611E−03 |

| Surface number | A14 | A16 | A18 | A20 |
|---|---|---|---|---|
| S1 | −1.4225E−01 | 2.5013E−02 | 0.0000E+00 | 0.0000E+00 |
| S3 | 1.3946E+03 | −3.6617E+03 | 5.5775E+03 | −3.6550E+03 |
| S4 | 1.2349E+02 | −1.9354E+02 | 1.6234E+02 | −5.5954E+01 |
| S5 | 9.3062E+01 | −9.6034E+01 | 4.9814E+01 | −9.0646E+00 |
| S6 | 3.7135E+01 | −5.9935E+01 | 4.8201E+01 | −1.5588E+01 |
| S7 | 3.2398E+00 | −3.8222E+00 | 2.0734E+00 | −4.3371E−01 |
| S8 | −2.7888E+00 | 8.5892E−01 | −9.8946E−02 | −3.0003E−03 |
| S9 | −2.3817E−01 | −2.9754E−02 | 3.3052E−02 | −5.5056E−03 |
| S10 | 1.4791E−01 | −5.7254E−02 | 1.2728E−02 | −1.2100E−03 |
| S11 | −3.5151E−02 | 9.9298E−03 | −2.0213E−03 | 1.9515E−04 |
| S12 | −5.3291E−04 | 2.6632E−04 | −3.8655E−05 | 2.0019E−06 |

TABLE 39

| AAS surface | AR | BR | CR | DR | AP | BP | CP | DP |
|---|---|---|---|---|---|---|---|---|
| S2 | 7.1048E−01 | −1.2224E+00 | 3.4790E+00 | −2.8886E+00 | −5.0508E−02 | −6.0255E−02 | −2.4346E−04 | 1.2591E−02 |

TABLE 40

| | | | |
|---|---|---|---|
| f1 (mm) | −4.19 | fx (mm) | 2.12 |
| f2 (mm) | 2.05 | fy (mm) | 2.22 |
| f3 (mm) | −5.39 | TTL (mm) | 4.97 |
| f4 (mm) | −11.50 | ImgH (mm) | 3.03 |
| f5 (mm) | 2.07 | HFOV (°) | 59.5 |
| f6 (mm) | −3.38 | | |

Figure 20:
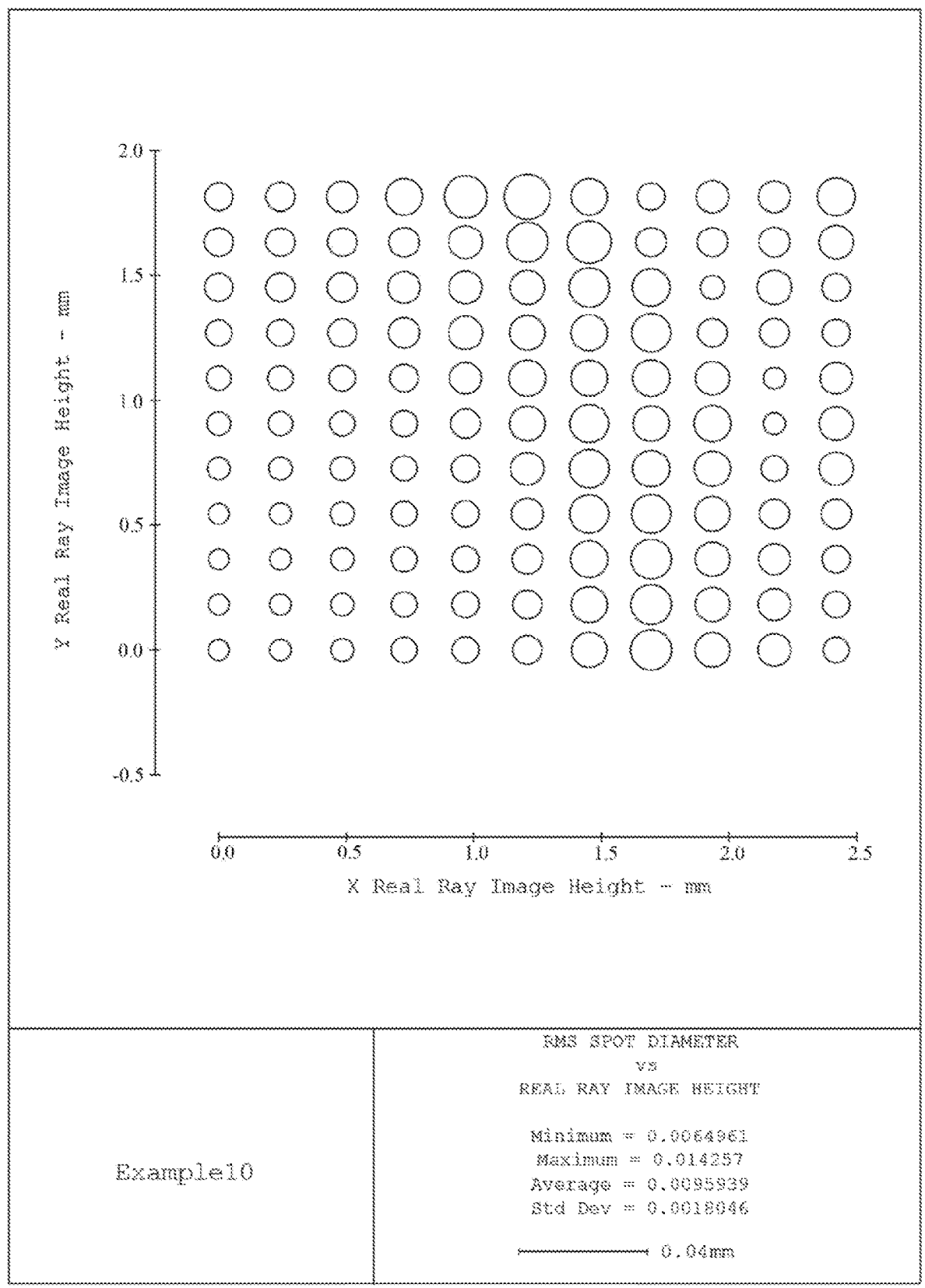
FIG. 20 schematically shows RMS spot diameter of the camera lens assembly of the example 10 in a first quadrant.

FIG. 20 illustrates a size distribution of an RMS spot diameter of the camera lens assembly according to example 10 at positions with different image heights in a first quadrant. It can be seen from FIG. 20 that the camera lens assembly provided in example 10 may achieve good image quality.

Example 11

Figure 21:
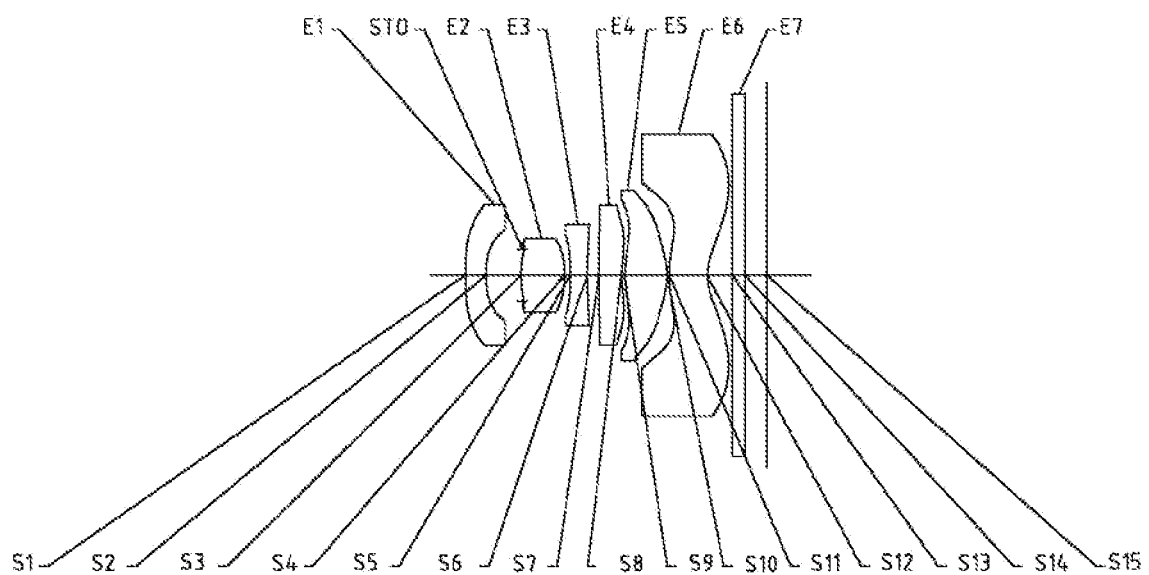
FIG. 21 illustrates a schematic structural view of a camera lens assembly according to example 11 of the present disclosure.

A camera lens assembly according to example 11 of the present disclosure is described below with reference to FIG. 21 and FIG. 22. FIG. 21 shows a schematic structural view of the camera lens assembly according to example 11 of the present disclosure.

As shown in FIG. 21, the camera lens assembly according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 41 shows the surface type, the radius of curvature X, the radius of curvature Y, the thickness, the material, the conic coefficient X and the conic coefficient Y of each lens of the camera lens assembly in example 11, wherein the units for the radius of curvature X, the radius of curvature Y and the thickness are millimeter (mm). Table 42 shows high-order coefficients applicable to each aspheric surface in example 11, wherein the surface shape of each aspheric surface may be defined by the formula (1) given in the above example 1. Table 43 shows high-order coefficients applicable to the rotationally symmetrical component and the non-rotationally symmetrical component of the non-rotationally symmetrical aspheric surface S9 in example 11, wherein the surface shape of the non-rotationally symmetrical aspheric surface may be defined by the formula (2) given in the above example 1. Table 44 shows effective focal lengths f1 to f6 of respective lens, an effective focal length fx in an X-axis direction of the camera lens assembly, an effective focal length fy in a Y-axis direction of the camera lens assembly, a total optical length TTL of the camera lens assembly, half of a diagonal length ImgH of an effective pixel area on the imaging plane S15, and half of a maximal field-of-view HFOV in example 11.

TABLE 41

| Surface number | Surface type | Radius of curvature Y | Radius of curvature X | Thickness | Refractive index | Abbe number | Conic coefficient Y | Conic coefficient X |
|---|---|---|---|---|---|---|---|---|
| OBJ | Spherical | Infinite | | Infinite | | | | |
| S1 | Aspheric | −119.595 | | 0.3305 | 1.54 | 55.7 | −95.0000 | |
| S2 | Aspheric | 2.220476 | | 0.6004 | | | −4.0040 | |
| STO | Spherical | Infinite | | −0.0272 | | | | |
| S3 | Aspheric | 1.989387 | | 0.7193 | 1.55 | 56.1 | −2.1136 | |
| S4 | Aspheric | −1.87436 | | 0.0985 | | | 4.6965 | |
| S5 | Aspheric | −12.9304 | | 0.2755 | 1.65 | 20.4 | 95.0000 | |
| S6 | Aspheric | 4.785091 | | 0.1916 | | | −20.5592 | |
| S7 | Aspheric | 9.441401 | | 0.3725 | 1.55 | 56.1 | −95.0000 | |
| S8 | Aspheric | 0.493083 | | 0.0500 | | | −95.0000 | |
| S9 (AAS surface) | Aspheric | 0.470009 | 0.5121 | 0.7008 | 1.55 | 56.1 | −81.6004 | −78.3849 |
| S10 | Aspheric | −1.24698 | | 0.0395 | | | −0.5496 | |
| S11 | Aspheric | 2.312564 | | 0.6240 | 1.65 | 20.4 | −1.5933 | |
| S12 | Aspheric | 0.86644 | | 0.4133 | | | −2.8841 | |
| S13 | Spherical | Infinite | | 0.2100 | 1.52 | 64.2 | | |
| S14 | Spherical | Infinite | | 0.3573 | | | | |
| S15 | Spherical | Infinite | | | | | | |

TABLE 42

| Surface number | A4 | A6 | A8 | A10 | A12 |
|---|---|---|---|---|---|
| S1 | 3.5000E−01 | −3.0867E−01 | 2.3707E−01 | −8.0586E−02 | −2.4437E−02 |
| S2 | 5.4015E−01 | 7.2403E−01 | −6.3506E+00 | 2.5100E+01 | −5.2384E+01 |
| S3 | −1.3182E−02 | 2.4967E+00 | −7.9233E+01 | 1.4122E+03 | −1.5619E+04 |
| S4 | −3.3361E−01 | 1.2538E+00 | −2.9744E+00 | −3.0012E+00 | 4.6808E+01 |
| S5 | −4.9625E−01 | 6.0347E−01 | 2.6865E+00 | −2.2374E+01 | 7.8998E+01 |
| S6 | −1.0323E−01 | −1.0678E+00 | 9.4912E+00 | −4.1494E+01 | 1.1569E+02 |
| S7 | −1.4548E−01 | 6.3919E−01 | −2.6341E+00 | 7.8126E+00 | −1.5025E+01 |
| S8 | 2.5509E−03 | −1.1501E+00 | 4.5402E+00 | −1.1898E+01 | 2.0263E+01 |
| S10 | 1.9864E−01 | 1.2923E+00 | −5.2537E+00 | 9.9471E+00 | −1.1259E+01 |
| S11 | 1.9935E−02 | −3.7533E−01 | 7.3619E−02 | 3.3837E−01 | −2.7234E−01 |
| S12 | −1.8817E−01 | 9.2854E−02 | −1.9536E−02 | −5.3019E−03 | 5.0185E−03 |

| Surface number | A14 | A16 | A18 | A20 |
|---|---|---|---|---|
| S1 | 2.7777E−02 | −7.5277E−03 | 0.0000E+00 | 0.0000E+00 |
| S2 | 5.9339E+01 | −2.9017E+01 | 0.0000E+00 | 0.0000E+00 |
| S3 | 1.0779E+05 | −4.5145E+05 | 1.0481E+06 | −1.0338E+06 |
| S4 | −1.8200E+02 | 4.0400E+02 | −5.3162E+02 | 3.1602E+02 |
| S5 | −1.8939E+02 | 3.2345E+02 | −3.5507E+02 | 1.7728E+02 |
| S6 | −2.1130E+02 | 2.4442E+02 | −1.6211E+02 | 4.6883E+01 |
| S7 | 1.8121E+01 | −1.3159E+01 | 5.1882E+00 | −8.3156E−01 |
| S8 | −2.1638E+01 | 1.4043E+01 | −5.0839E+00 | 7.8869E−01 |
| S10 | 7.9327E+00 | −3.4095E+00 | 8.1921E−01 | −8.4351E−02 |
| S11 | −1.7880E−02 | 1.0068E−01 | −4.2347E−02 | 5.6846E−03 |
| S12 | −1.6238E−03 | 2.8390E−04 | −2.6505E−05 | 1.0345E−06 |

TABLE 43

| AAS surface | AR | BR | CR | DR | AP | BP | CP | DP |
|---|---|---|---|---|---|---|---|---|
| S9 | 1.7712E−01 | −4.3468E−01 | 2.4840E−01 | −4.6824E−02 | 1.0985E−02 | 5.5078E−03 | 5.3552E−03 | 6.0722E−03 |

TABLE 44

| | | | |
|---|---|---|---|
| f1 (mm) | −4.06 | fx (mm) | 2.10 |
| f2 (mm) | 1.89 | fy (mm) | 1.70 |
| f3 (mm) | −5.21 | TTL (mm) | 4.99 |
| f4 (mm) | −0.98 | ImgH (mm) | 3.03 |
| f5 (mm) | 0.73 | HFOV (°) | 55.4 |
| f6 (mm) | −2.51 | | |

Figure 22:
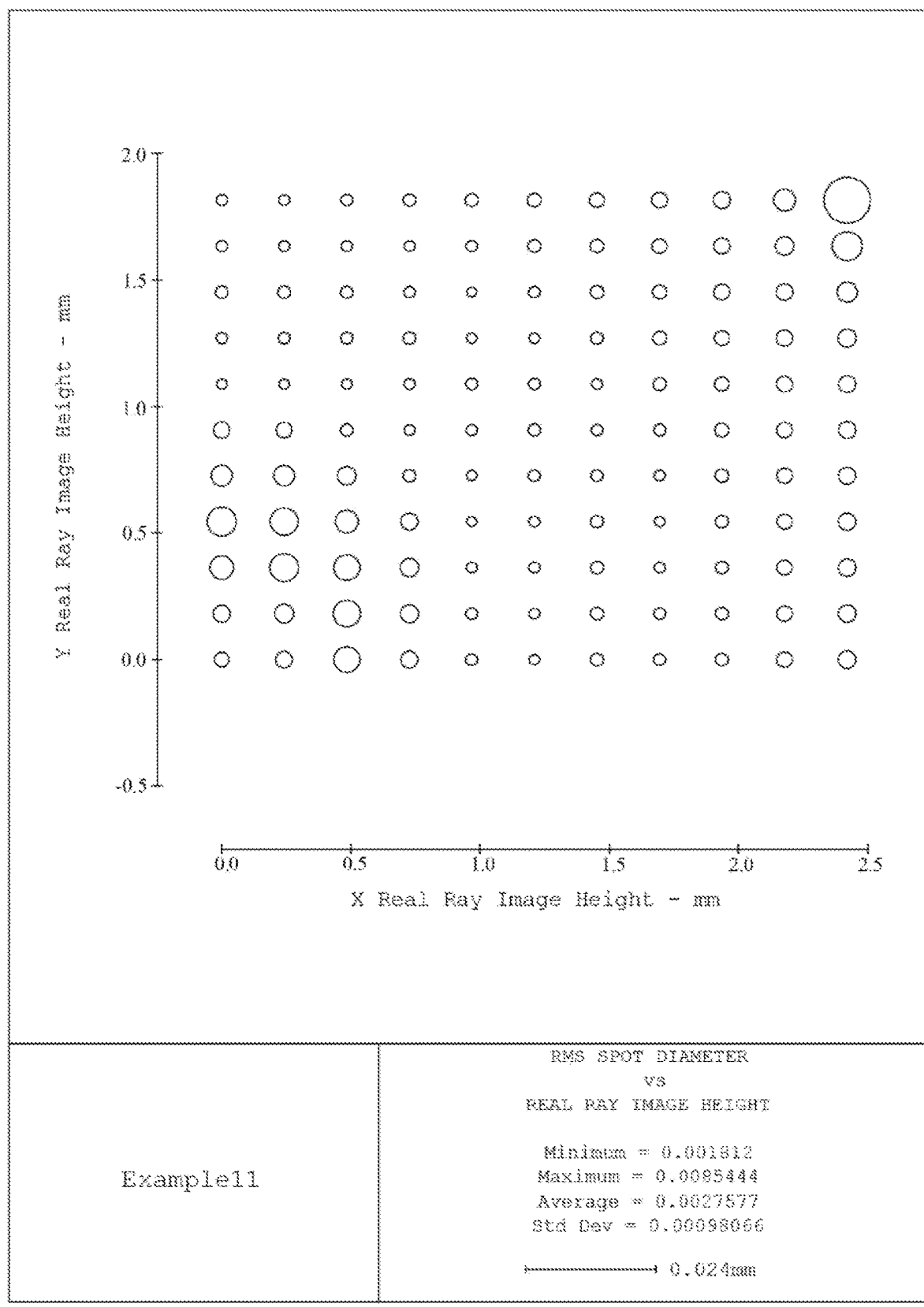
FIG. 22 schematically shows RMS spot diameter of the camera lens assembly of the example 11 in a first quadrant.

FIG. 22 illustrates a size distribution of an RMS spot diameter of the camera lens assembly according to example 11 at positions with different image heights in a first quadrant. It can be seen from FIG. 22 that the camera lens assembly provided in example 11 may achieve good image quality.

Example 12

Figure 23:
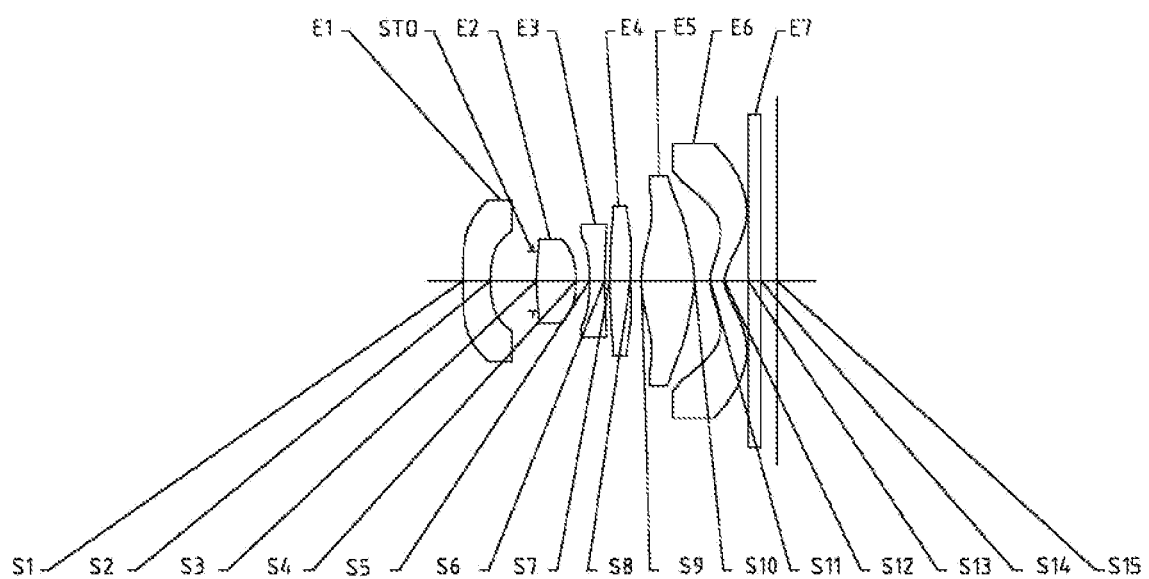
FIG. 23 illustrates a schematic structural view of a camera lens assembly according to example 12 of the present disclosure.

A camera lens assembly according to example 12 of the present disclosure is described below with reference to FIG. 23 and FIG. 24. FIG. 23 shows a schematic structural view of the camera lens assembly according to example 12 of the present disclosure.

As shown in FIG. 23, the camera lens assembly according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a concave surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 45 shows the surface type, the radius of curvature X, the radius of curvature Y, the thickness, the material, the conic coefficient X and the conic coefficient Y of each lens of the camera lens assembly in example 12, wherein the units for the radius of curvature X, the radius of curvature Y and the thickness are millimeter (mm). Table 46 shows high-order coefficients applicable to each aspheric surface in example 12, wherein the surface shape of each aspheric surface may be defined by the formula (1) given in the above example 1. Table 47 shows high-order coefficients applicable to the rotationally symmetrical component and the non-rotationally symmetrical component of the non-rotationally symmetrical aspheric surface S12 in example 12, wherein the surface shape of the non-rotationally symmetrical aspheric surface may be defined by the formula (2) given in the above example 1. Table 48 shows effective focal lengths f1 to f6 of respective lens, an effective focal length fx in an X-axis direction of the camera lens assembly, an effective focal length fy in a Y-axis direction of the camera lens assembly, a total optical length TTL of the camera lens assembly, half of a diagonal length ImgH of an effective pixel area on the imaging plane S15, and half of a maximal field-of-view HFOV in example 12.

TABLE 45

| Surface number | Surface type | Radius of curvature Y | Radius of curvature X | Thickness | Material Refractive index | Material Abbe number | Conic coefficient Y | Conic coefficient X |
|---|---|---|---|---|---|---|---|---|
| OBJ | Spherical | Infinite | | Infinite | | | | |
| S1 | Aspheric | −21.4328 | | 0.4488 | 1.54 | 55.7 | −95.0000 | |
| S2 | Aspheric | 2.466425 | | 0.6994 | | | 6.9369 | |
| STO | Spherical | Infinite | | 0.0641 | | | | |
| S3 | Aspheric | 2.77208 | | 0.6542 | 1.55 | 56.1 | −18.9452 | |
| S4 | Aspheric | −1.62574 | | 0.2245 | | | 3.1168 | |
| S5 | Aspheric | −5.65594 | | 0.2396 | 1.65 | 20.4 | 38.4936 | |
| S6 | Aspheric | 5.516029 | | 0.0890 | | | −28.2269 | |
| S7 | Aspheric | 5.790858 | | 0.3414 | 1.55 | 56.1 | −95.0000 | |
| S8 | Aspheric | 3.574752 | | 0.1799 | | | −30.9255 | |
| S9 | Aspheric | 2.246711 | | 0.8749 | 1.55 | 56.1 | −2.4044 | |
| S10 | Aspheric | −1.40784 | | 0.2620 | | | −0.4631 | |
| S11 | Aspheric | 0.605712 | | 0.2324 | 1.65 | 20.4 | −7.2290 | |
| S12 (AAS surface) | Aspheric | 0.372462 | 0.4167 | 0.3921 | | | −3.6764 | −3.4014 |

TABLE 45-continued

| Surface number | Surface type | Radius of curvature Y | Radius of curvature X | Thickness | Material Refractive index | Abbe number | Conic coefficient Y | Conic coefficient X |
|---|---|---|---|---|---|---|---|---|
| S13 | Spherical | Infinite | | 0.2100 | 1.52 | 64.2 | | |
| S14 | Spherical | Infinite | | 0.2675 | | | | |
| S15 | Spherical | Infinite | | | | | | |

TABLE 46

| Surface number | A4 | A6 | A8 | A10 | A12 |
|---|---|---|---|---|---|
| S1 | 2.8663E−01 | −2.7030E−01 | 2.9325E−01 | −2.3588E−01 | 1.2922E−01 |
| S2 | 2.6575E−01 | 1.0051E+00 | −6.5955E+00 | 2.1937E+01 | −4.0519E+01 |
| S3 | 6.0938E−02 | −1.3877E+00 | 8.7706E+00 | 2.9233E+01 | −1.1738E+03 |
| S4 | −3.9680E−01 | 3.5883E+00 | −3.7022E+01 | 2.4210E+02 | −1.0150E+03 |
| S5 | −2.1207E−01 | −2.2017E+00 | 2.1645E+01 | −1.1974E+02 | 4.1922E+02 |
| S6 | −8.2534E−02 | −1.6847E−01 | 1.0352E+00 | −3.1945E+00 | 6.8652E+00 |
| S7 | −1.4119E−01 | 8.1612E−01 | −3.6774E+00 | 1.0770E+01 | −2.0482E+01 |
| S8 | −1.9123E−01 | 2.5948E−02 | −9.1478E−01 | 4.1279E+00 | −8.6458E+00 |
| S9 | 2.3560E−01 | −8.8925E−01 | 1.6090E+00 | −2.0192E+00 | 1.6144E+00 |
| S10 | 4.1441E−01 | −3.2832E−01 | 3.1700E−01 | −4.8072E−01 | 4.9662E−01 |
| S11 | 4.2930E−02 | −8.9662E−01 | 1.7372E+00 | −2.0753E+00 | 1.5753E+00 |

| Surface number | A14 | A16 | A18 | A20 |
|---|---|---|---|---|
| S1 | −4.0839E−02 | 5.2974E−03 | 0.0000E+00 | 0.0000E+00 |
| S2 | 4.0489E+01 | −1.7194E+01 | 0.0000E+00 | 0.0000E+00 |
| S3 | 9.5561E+03 | −3.7862E+04 | 7.5487E+04 | −6.0862E+04 |
| S4 | 2.7070E+03 | −4.4435E+03 | 4.0914E+03 | −1.6212E+03 |
| S5 | −9.3004E+02 | 1.2676E+03 | −9.6739E+02 | 3.1619E+02 |
| S6 | −9.0503E+00 | 6.5315E+00 | −1.9390E+00 | −2.3410E−02 |
| S7 | 2.5602E+01 | −2.0244E+01 | 9.1199E+00 | −1.7734E+00 |
| S8 | 1.0623E+01 | −7.6467E+00 | 2.9571E+00 | −4.7352E−01 |
| S9 | −7.7633E−01 | 2.1059E−01 | −2.7490E−02 | 9.9526E−04 |
| S10 | −2.9587E−01 | 1.0153E−01 | −1.8726E−02 | 1.4355E−03 |
| S11 | −7.4530E−01 | 2.1154E−01 | −3.2838E−02 | 2.1379E−03 |

TABLE 47

| AAS surface | AR | BR | CR | DR | AP | BP | CP | DP |
|---|---|---|---|---|---|---|---|---|
| S12 | −1.8649E−01 | 5.4977E−02 | −8.2957E−03 | 4.9410E−04 | −3.7863E−02 | −3.1762E−02 | −2.3832E−02 | −1.7681E−02 |

TABLE 48

| f1 (mm) | −4.09 | fx (mm) | 1.63 |
|---|---|---|---|
| f2 (mm) | 1.98 | fy (mm) | 1.90 |
| f3 (mm) | −4.15 | TTL (mm) | 5.23 |
| f4 (mm) | −18.09 | ImgH (mm) | 3.03 |
| f5 (mm) | 1.73 | HFOV (°) | 55.2 |
| f6 (mm) | −2.41 | | |

Figure 24:
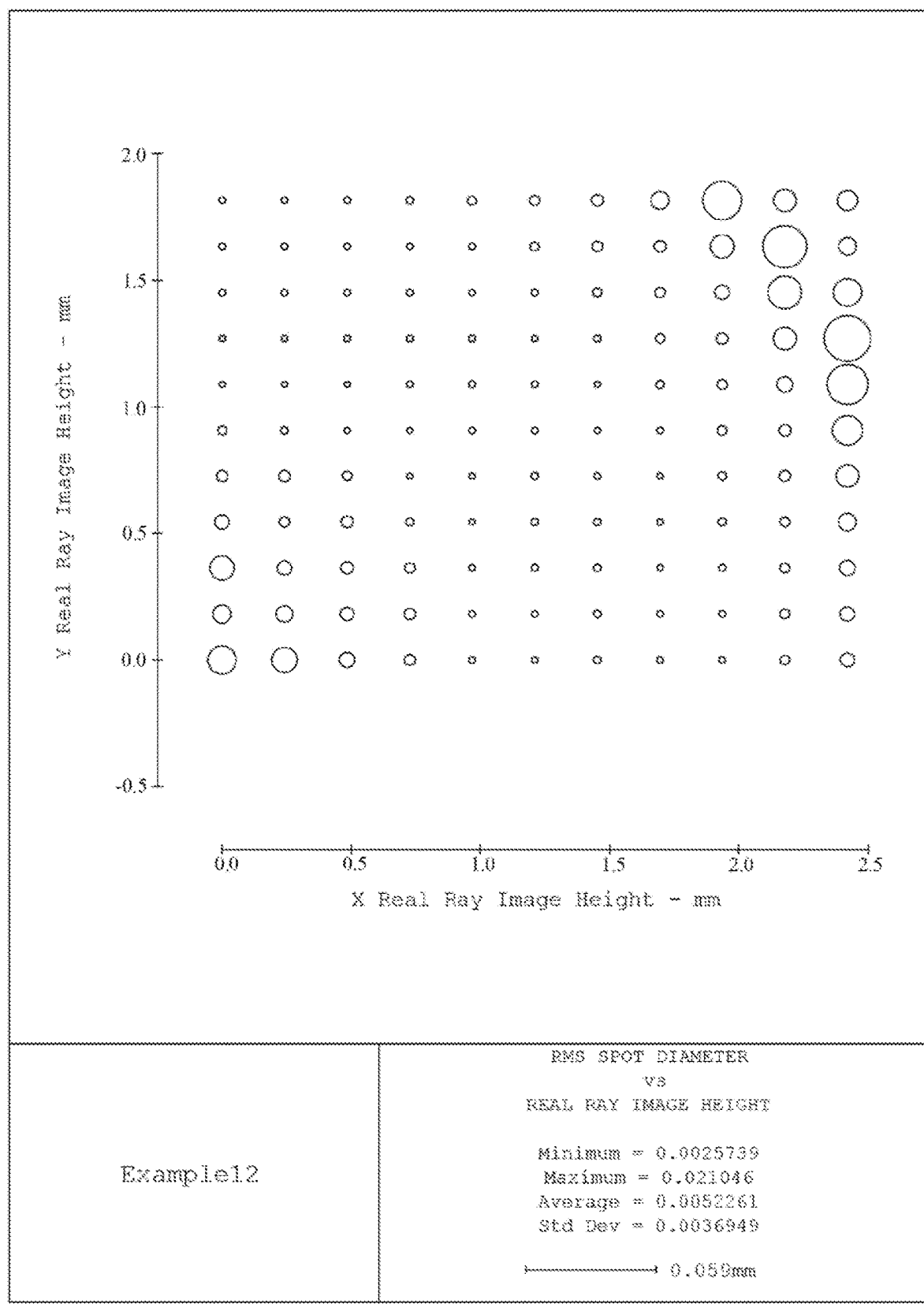
FIG. 24 schematically shows RMS spot diameter of the camera lens assembly of the example 12 in a first quadrant.

FIG. 24 illustrates a size distribution of an RMS spot diameter of the camera lens assembly according to example 12 at positions with different image heights in a first quadrant. It can be seen from FIG. 24 that the camera lens assembly provided in example 12 may achieve good image quality.

In view of the above, examples 1 to 12 respectively satisfy the relationship shown in Table 49.

TABLE 49

| Condition | Example 1 | 2 | 3 | 4 | 5 | 6 |
|---|---|---|---|---|---|---|
| fx/fy | 1.00 | 1.01 | 1.03 | 1.01 | 1.01 | 1.01 |
| FOV (°) | 120.4 | 120.2 | 120.6 | 120.6 | 120.6 | 120.6 |
| TTL/ImgH | 1.71 | 1.68 | 1.66 | 1.7 | 1.7 | 1.79 |
| f2/f1 | −0.48 | −0.54 | −0.54 | −0.55 | −0.54 | −0.58 |
| \|1/f5 − 1/f6\| | 0.73 | 0.8 | 0.6 | 0.93 | 0.99 | 0.91 |
| R9/R8 | 0.81 | 1.01 | 1.28 | 0.63 | 0.52 | 0.85 |
| CT3/CT4 | 0.57 | 0.73 | 0.71 | 0.72 | 0.65 | 0.67 |
| CT6/ET6 | 0.60 | 0.61 | 0.90 | 0.75 | 0.68 | 0.54 |
| SAG51/SAG61 | −0.17 | −0.27 | −0.36 | −0.06 | −0.10 | −0.10 |
| SL (mm) | 4.24 | 4.12 | 4.08 | 4.14 | 4.16 | 4.14 |

TABLE 49-continued

| Condition | Example | | | | | |
|---|---|---|---|---|---|---|
| | 7 | 8 | 9 | 10 | 11 | 12 |
| fx/fy | 1.00 | 0.89 | 1.09 | 0.95 | 1.24 | 0.86 |
| FOV (°) | 120.8 | 120 | 118.2 | 119 | 110.8 | 110.4 |
| TTL/ImgH | 1.7 | 1.62 | 1.63 | 1.64 | 1.65 | 1.73 |
| f2/f1 | −0.5 | −0.47 | −0.46 | −0.49 | −0.47 | −0.48 |
| \|1/f5 − 1/f6\| | 0.83 | 2.29 | 2.13 | 0.78 | 1.77 | 0.99 |
| R9/R8 | 0.36 | 1.00 | 0.87 | 0.94 | 0.95 | 0.63 |
| CT3/CT4 | 0.65 | 0.94 | 0.94 | 0.61 | 0.74 | 0.70 |
| CT6/ET6 | 0.57 | 0.46 | 0.43 | 0.61 | 0.54 | 0.38 |
| SAG51/SAG61 | −0.34 | 0.00 | −0.02 | −0.23 | 0.10 | −0.22 |
| SL (mm) | 4.07 | 4.01 | 4.07 | 4.08 | 4.03 | 4.03 |

The present disclosure further provides a camera apparatus, having an electronic photosensitive element which may be a photosensitive Charge-Coupled Device (CCD) or a Complementary Metal-Oxide Semiconductor (CMOS). The camera apparatus may be an independent camera device such as a digital camera, or may be a camera module integrated in a mobile electronic device, such as a mobile phone. The camera apparatus is equipped with the camera lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens assembly, sequentially from an object side to an image side along an optical axis, comprising: a first lens, a second lens, a third lens, a fourth lens, a fifth lens and a sixth lens,
   wherein,
   the first lens has negative refractive power;
   the second lens has positive refractive power;
   the third lens has negative refractive power;
   the fourth lens has refractive power;
   the fifth lens has refractive power; and
   the sixth lens has negative refractive power;
   wherein at least one of the first lens to the sixth lens has a non-rotationally symmetric aspheric surface,
   wherein $0.5 < fx/fy < 1.5$, where fx is an effective focal length in an X-axis direction of the camera lens assembly, and fy is an effective focal length in a Y-axis direction of the camera lens assembly, and
   wherein a direction parallel to the optical axis is defined as a Z-axis direction, a direction perpendicular to the Z-axis and located on a tangential plane is the Y-axis direction, and a direction perpendicular to the Z-axis and located on a sagittal plane is the X-axis direction.

2. The camera lens assembly according to claim 1, wherein each of an object-side surface and an image-side surface of the second lens is a convex surface,
   the fourth lens has negative refractive power,
   the fifth lens has positive refractive power, and
   each of an object-side surface and an image-side surface of the fifth lens is a convex surface.

3. The camera lens assembly according to claim 1, wherein $0.5 \text{ mm}^{-1} < |1/f5 - 1/f6| < 2.5 \text{ mm}^{-1}$,
   where f5 is an effective focal length of the fifth lens, and f6 is an effective focal length of the sixth lens.

4. The camera lens assembly according to claim 1, wherein $-0.6 < f2/f1 < -0.4$,
   where f1 is an effective focal length of the first lens, and f2 is an effective focal length of the second lens.

5. The camera lens assembly according to claim 1, wherein the first lens has a non-rotationally symmetrical aspheric surface.

6. The camera lens assembly according to claim 1, wherein $0 < R9/R8 < 1.5$,
   where R9 is a radius of curvature of an object-side surface of the fifth lens, and R8 is a radius of curvature of an image-side surface of the fourth lens.

7. The camera lens assembly according to claim 1, wherein $0.2 < CT6/ET6 < 1$,
   where CT6 is a center thickness of the sixth lens along the optical axis, and ET6 is an edge thickness of the sixth lens in a direction parallel to the optical axis.

8. The camera lens assembly according to claim 1, wherein $-0.5 < SAG51/SAG61 < 0.5$,
   where SAG51 is a distance along the optical axis from an intersection of an object-side surface of the fifth lens and the optical axis to a projection point of a vertex of an effective radius of the object-side surface of the fifth lens onto the optical axis, and SAG61 is a distance along the optical axis from an intersection of an object-side surface of the sixth lens and the optical axis to a projection point of a vertex of an effective radius of the object-side surface of the sixth lens onto the optical axis.

9. The camera lens assembly according to claim 1, wherein the camera lens assembly further comprises a stop, and $4.24 \text{ mm} \geq SL \geq 4 \text{ mm}$,
   where SL is a distance along the optical axis from the stop to an imaging plane of the camera lens assembly.

10. The camera lens assembly according to claim 1, wherein $TTL/ImgH < 1.8$,
    where TTL is a distance along the optical axis from a center of an object-side surface of the first lens to an imaging plane of the camera lens assembly, and ImgH is half of a diagonal length of an effective pixel area on the imaging plane of the camera lens assembly.

11. The camera lens assembly according to claim 1, wherein $FOV > 90°$,
    where FOV is a full field-of-view of the camera lens assembly.

12. The camera lens assembly according to claim 1, wherein $0.5 < CT3/CT4 < 1$, where CT3 is a center thickness of the third lens along the optical axis, and CT4 is a center thickness of the fourth lens along the optical axis.

13. The camera lens assembly according to claim 12, wherein $0.5 \text{ mm}^{-1} < |1/f5 - 1/f6| < 2.5 \text{ mm}^{-1}$,
    where f5 is an effective focal length of the fifth lens, and f6 is an effective focal length of the sixth lens.

14. The camera lens assembly according to claim 12, wherein $-0.6 < f2/f1 < -0.4$,
    where f1 is an effective focal length of the first lens, and f2 is an effective focal length of the second lens.

15. The camera lens assembly according to claim 12, wherein $0 < R9/R8 < 1.5$,
    where R9 is a radius of curvature of an object-side surface of the fifth lens, and R8 is a radius of curvature of an image-side surface of the fourth lens.

16. The camera lens assembly according to claim 12, wherein 0.2<CT6/ET6<1,
   where CT6 is a center thickness of the sixth lens along the optical axis, and ET6 is an edge thickness of the sixth lens.

17. The camera lens assembly according to claim 12, wherein −0.5<SAG51/SAG61<0.5,
   where SAG51 is a distance along the optical axis from an intersection of an object-side surface of the fifth lens and the optical axis to a projection point of a vertex of an effective radius of the object-side surface of the fifth lens onto the optical axis, and SAG61 is a distance along the optical axis from an intersection of an object-side surface of the sixth lens and the optical axis to a projection point of a vertex of an effective radius of the object-side surface of the sixth lens onto the optical axis.

18. The camera lens assembly according to claim 12, wherein FOV>90°, where FOV is a full field-of-view of the camera lens assembly.

19. The camera lens assembly according to claim 1, wherein 0.5<fx/fy≤0.95 or 1.01≤fx/fy<1.5.

20. The camera lens assembly according to claim 1, wherein the fourth lens has negative refractive power, the fifth lens has positive refractive power, and 1.62≤TTL/ImgH<1.8,
   where TTL is a distance along the optical axis from a center of an object-side surface of the first lens to an imaging plane of the camera lens assembly, and ImgH is half of a diagonal length of an effective pixel area on the imaging plane of the camera lens assembly.

* * * * *